US012587047B2

(12) United States Patent
Lee et al.

(10) Patent No.: US 12,587,047 B2
(45) Date of Patent: Mar. 24, 2026

(54) SEGMENTED STATOR CORE FOR AN ELECTRIC MOTOR

(71) Applicant: LG MAGNA E-POWERTRAIN CO., LTD., Incheon (KR)

(72) Inventors: Hyounggun Lee, Incheon (KR); Jiwon Lee, Incheon (KR); Changmin Park, Incheon (KR)

(73) Assignee: LG MAGNA E-POWERTRAIN CO., LTD., Incheon (KR)

( * ) Notice: Subject to any disclaimer, the term of this patent is extended or adjusted under 35 U.S.C. 154(b) by 318 days.

(21) Appl. No.: 18/271,093

(22) PCT Filed: Dec. 2, 2021

(86) PCT No.: PCT/KR2021/018134
§ 371 (c)(1),
(2) Date: Jul. 6, 2023

(87) PCT Pub. No.: WO2022/149730
PCT Pub. Date: Jul. 14, 2022

(65) Prior Publication Data
US 2024/0014696 A1 Jan. 11, 2024

(30) Foreign Application Priority Data
Jan. 6, 2021 (KR) ......................... 10-2021-0001348

(51) Int. Cl.
*H02K 1/14* (2006.01)
*H02K 15/026* (2025.01)

(52) U.S. Cl.
CPC ........... *H02K 1/148* (2013.01); *H02K 15/026* (2013.01)

(58) Field of Classification Search
CPC .................................. H02K 1/148; H02K 1/16
See application file for complete search history.

(56) References Cited

U.S. PATENT DOCUMENTS

2005/0067912 A1* 3/2005 Murakami ............. H02K 1/148
310/216.043
2005/0125989 A1* 6/2005 Lee ...................... H02K 15/022
29/598
(Continued)

FOREIGN PATENT DOCUMENTS

JP 09308143 11/1997
JP 2004312790 11/2004
(Continued)

OTHER PUBLICATIONS

JP-2009254086-A Machine Translation (Year: 2009).*
(Continued)

*Primary Examiner* — Oluseye Iwarere
*Assistant Examiner* — Masoud Vaziri
(74) *Attorney, Agent, or Firm* — LEE, HONG, DEGERMAN, KANG & WAIMEY

(57) ABSTRACT

A motor including: a stator; and a rotor rotating about the stator. The stator has: a stator core having a plurality of split cores respectively having a plurality of teeth and slots and coupled into a ring shape; and a stator coil inserted in the slots. The plurality of split cores has: a plurality of yoke parts positioned adjacent to each other; a plurality of teeth parts respectively protruding from the plurality of yoke parts in the radial direction; a cutting part cut in the radial direction between the yoke parts which are adjacent to each other; and a connection part for connecting the yoke parts which are adjacent to each other so as to be able to relatively rotate. Therefore, the size of scraps can be reduced when manufacturing the stator core.

17 Claims, 24 Drawing Sheets

(56)     References Cited

U.S. PATENT DOCUMENTS

| | | | |
|---|---|---|---|
| 2010/0270888 A1* | 10/2010 | Nagai | H02K 15/026 |
| | | | 310/216.043 |
| 2013/0076200 A1 | 3/2013 | Jo | |
| 2021/0320539 A1* | 10/2021 | Kamogi | H02K 5/1732 |
| 2022/0216742 A1* | 7/2022 | Takayama | H02K 1/148 |

FOREIGN PATENT DOCUMENTS

| | | | |
|---|---|---|---|
| JP | 2004312790 A | * | 11/2004 |
| JP | 2007143258 | | 6/2007 |
| JP | 4349831 | | 10/2009 |
| JP | 2009254086 | | 10/2009 |
| JP | 2009254086 A | * | 10/2009 |
| JP | 5837147 | | 12/2015 |
| JP | 5837147 B1 | * | 12/2015 |
| WO | 2020-039682 | | 2/2020 |

OTHER PUBLICATIONS

JP-5837147-B1 Machine Translation (Year: 2015).*
JP-2004312790-A Machine Translation (Year: 2004).*
PCT International Application No. PCT/KR2021/018134, International Search Report dated Mar. 11, 2022, 4 pages.
European Patent Office Application Serial No. 21917892.8, Search Report dated Nov. 11, 2024, 11 pages.

* cited by examiner

SEGMENTED STATOR CORE FOR AN ELECTRIC MOTOR

CROSS-REFERENCE TO RELATED APPLICATIONS

This application is the National Stage filing under 35 U.S.C. 371 of International Application No. PCT/KR2021/018134, filed on Dec. 2, 2021, which claims the benefit of earlier filing date and right of priority to Korean Application No. 10-2021-0001348, filed on Jan. 6, 2021, the contents of which are all hereby incorporated by reference herein in their entirety.

TECHNICAL FIELD

The present disclosure relates to a motor.

BACKGROUND

As is well known, an electric motor or a motor is an apparatus that converts electric energy into mechanical energy.

The electric motor includes a stator and a rotor capable of rotating with respect to the stator.

The stator may include a stator core and a stator coil wound around the stator core.

The stator core includes a yoke and teeth protruding from the yoke.

The stator core is provided by stacking a plurality of electric steel plates including the yoke and the teeth using an insulation method.

The electric steel plate of the stator core is formed by pressing a general base material into a mold for forming the yoke and the teeth.

With respect to a method of manufacturing a stator core in the related art, since a ratio of scraps to the base material varies according to shapes and arrangement of the yoke and the teeth, the shapes and arrangement of the yoke and the teeth are keys to enhancement of manufacturing productivity.

Among methods of manufacturing a stator core in the related art, a method of manufacturing a stator core using a split core obtained by splitting the stator core into a shape including a single yoke and single teeth is being used.

However, the method of manufacturing a stator core using a split core including a single yoke and single teeth has a problem in that concentricity of the teeth may not be easily maintained when the split core is coupled into a circular shape.

Thus, since an air gap between the stator and the rotor becomes uneven, deterioration in an output from a motor may occur due to unevenness of the air gap between the stator and the rotor.

In addition, as the shape including a single yoke and single teeth is used for a motor having a relatively small number of teeth and slots in a stator core, a length of the yoke may be relatively great compared to a width of the teeth. Thus, this may result in a problem such that a ratio of scraps to a base material increases, thereby worsening productivity.

In addition, in a case of a method of manufacturing a stator core of a motor using a split core, coupling strength of a yoke part in a radial direction after coupling of the split core deteriorates. Accordingly, due to action of magnetic force between the stator and the rotor in a radial direction during operation, the stator moves in a radial direction, thus worsening output from the motor.

In addition, in manufacture of a stator core and a rotor core of some motors, a method of forming the rotor core using a scrap portion removed when an inner rotor accommodation hole is formed in the stator core is being used.

However, the stator core and rotor core manufacturing method in which a rotor core is manufactured using scraps in the stator core has a problem in that there is a limit in reducing scraps generated from four outer corners of the stator core, and a size of scraps for forming teeth and slots in the stator core.

Therefore, an aspect of the present disclosure is to provide a motor capable of reducing a size of scraps when a stator core is manufactured.

Still another aspect of the present disclosure is to provide a motor capable of enhancing reliability of concentricity of a teeth part.

Still another aspect of the present disclosure is to provide a motor capable of enhancing coupling strength of a yoke part of a split core in a radial direction.

Still another aspect of the present disclosure is to provide a motor capable of facilitating molding of a split core by reducing a spring back.

To achieve these and other advantages and in accordance with the purpose of the present disclosure, as embodied and broadly described herein, there is provided a motor having a stator including a plurality of split cores, and the plurality of split cores respectively has a plurality of yoke parts hingedly rotatable relative to each other.

In detail, the stator in the motor includes a plurality of split cores coupled into a ring shape, the plurality of split cores includes a plurality of yoke parts and a plurality of teeth parts, and a cutting part cut in a radial direction and a connection part for connecting the plurality of yoke parts are provided between the yoke parts which are adjacent to each other. Thus, a size of scraps remaining when the split cores are molded may be reduced.

In addition, as the adjacent yoke parts are manufactured to be connected by the connection part, ends of the plurality of teeth parts may be arranged on a same line. Thus, reliability of concentricity of the plurality of teeth parts may be enhanced.

By doing so, an air gap between the stator core and the rotor may be kept even, thereby enhancing output from the motor.

The stator includes a stator core having a plurality of split cores respectively coupled into a ring shape, and a stator coil wound around the stator core.

The plurality of split cores includes a plurality of slots provided between the plurality of teeth parts.

In an implementation of the present disclosure, the motor includes: a stator; and a rotor rotating about the stator, and the stator has: a stator core having a plurality of split cores respectively having a plurality of teeth and slots and coupled into a ring shape; and a stator coil inserted in the slots. The plurality of split cores has: a plurality of yoke parts positioned adjacent to each other; a plurality of teeth parts respectively protruding from the plurality of yoke parts in a radial direction; a cutting part cut in a radial direction between yoke parts which are adjacent to each other; and a connection part for connecting the yoke parts which are adjacent to each other to be relatively rotatable.

Thus, with respect to the plurality of split cores, two split cores may be molded from a single base material in a state where respective teeth parts of the two split cores are interleaved and alternately arranged, thereby remarkably reducing a size of remaining scraps.

In addition, since the plurality of yoke parts in each of the plurality of split cores are manufactured in a state of being connected by respective connection parts, the plurality of yoke parts and the plurality of teeth parts may be arranged on a same line. Thus, reliability of concentricity of the plurality of teeth parts may be enhanced.

By doing so, an air gap between the stator core and the rotor may be kept even, thereby enhancing output from the motor.

In an implementation of the present disclosure, the stator is configured to include forty eight teeth and slots.

Thus, a size of remaining scraps may be further reduced in manufacture of the stator core, thereby enhancing productivity.

In some implementations, each of the plurality of yoke parts is provided with a fitting coupling portion to be coupled to each other.

In an implementation of the present disclosure, the fitting coupling portion includes a protrusion protruding from one of two yoke parts adjacent to each other in a circumferential direction, and a protrusion accommodation portion recessed to accommodate the protrusion is provided at the other of the adjacent two yoke parts.

Thus, coupling strength of each of the plurality of split cores in a radial direction may increase.

In addition, since the plurality of split cores are manufactured in an expanded state to be bent and molded into a circular arc shape, a spring-back phenomenon in forming the split cores may be reduced, and thus, bending and molding of the plurality of split cores may be facilitated.

In an implementation of the present disclosure, the plurality of teeth parts are provided to have a same width along a radial direction, the cutting part is configured to include a parallel section arranged in parallel with a side surface of the plurality of teeth parts; and an inclined section angled from the parallel section.

Here, when the plurality of split cores are expanded, a width of the parallel section of the plurality of yoke parts along an arrangement direction is provided as being 1.2 to 1.5 times a thickness of an electric steel plate of the plurality of split cores.

Thus, when the plurality of split cores are bent and molded, occurrence of failure in molding of the plurality of yoke parts may be suppressed, and a size of remaining scraps may be minimized.

In an implementation of the present disclosure, forming the plurality of split cores includes forming a first split core in which the plurality of yoke parts are linearly arranged along a first long side portion of an electric steel plate having a rectangular shape; and a second split core in which the plurality of yoke parts are linearly arranged along a second long side portion parallel with the first long side portion.

Here, a plurality of teeth parts of the first split core and a plurality of teeth parts of the second split core oppose each other and are interleaved and alternately arranged along a longitudinal direction of the first long side portion of the electric steel plate.

By doing so, after the first split core and the second core are molded from the base material, a size of remaining scraps may be minimized.

In an implementation of the present disclosure, ends of the plurality of teeth parts in the first split core and the second split core are provided with shoes outwardly laterally extending along a widthwise direction, through portions for providing the teeth and the shoes are provided at both sides along a widthwise direction of the ends of the shoes, and a space between the ends of the shoes and the through portions is provided as being 1.2 times or greater a thickness of the electric steel plate.

By doing so, when the first split core and the second split core are molded, occurrence of failure in the plurality of teeth parts may be suppressed and a size of remaining scraps may be minimized.

In an implementation of the present disclosure, the protrusion and the protrusion accommodation portion are provided to include a first side surface shaped with a circular arc shape having a radius with a center at the connection portion with a first radius, and a second side surface shaped with a circular arc shape having a radius with a center at the connection portion with a second radius greater than the first radius.

Thus, remaining scraps during manufacture of the first split core and the second split core may be minimized, and after coupling, coupling strength of the plurality of yoke parts in a radial direction may be enhanced.

In addition, when the first split core and the second split core are molded into a circular arc shape, a spring-back phenomenon in the first split core and the second split core may be reduced, and thus, molding of the first split core and the second split core may be facilitated.

In an implementation of the present disclosure, both side surfaces of the teeth parts are arranged along a radial direction, and the plurality of slots is configured to have a same width.

The stator coil is configured to include a plurality of conductor segments inserted into the slots.

In an implementation of the present disclosure, notches recessed inwardly are provided outside the connecting part along a radial direction of the plurality of yoke parts.

Thus, when the plurality of split cores are molded into a circular arc shape, molding of the plurality of split cores may be facilitated.

In an implementation of the present disclosure, a communication hole connected with the cutting part is positioned inwardly from the connection part along a radial direction of the yoke part, and the communication hole is provided through a stacked plurality of yoke parts along an axial direction.

Thus, when the plurality of split cores are molded into a circular arc shape, molding of the plurality of split cores may be facilitated.

In addition, when the plurality of cutting parts are formed, occurrence of failure due to a damage to and/or deformation of the connection part may be suppressed.

In an implementation of the present disclosure, a rotor accommodation hole configured to accommodate the rotor to be rotatable is defined by an inner surface of the stator core, and an inner surface portion having a circular arc shape and having the rotor accommodation hole provided therein is arranged at inner ends of the plurality of teeth parts.

Here, the inner surface portions of the yoke parts and the inner surface portions of the teeth parts may have a same curvature radius.

By doing so, when the first split core and the second split core are formed, the plurality of yoke parts and the plurality of teeth parts may be molded simultaneously, and thus, remaining scraps may be reduced.

In an implementation of the present disclosure, a coupling protrusion protruding along a circumferential direction is provided at one split core of two adjacent split cores along a circumferential direction, and a coupling protrusion accommodation portion in which the coupling protrusion is accommodated is arranged on another of the adjacent split cores.

This may enhance coupling force of the plurality of split cores.

In an implementation of the present disclosure, the coupling protrusion accommodation portion is provided with an opening open toward the coupling protrusion along a circumferential direction, and the coupling protrusion has a maximum width greater than a width of the opening, such that the coupling protrusion is coupled into the coupling protrusion accommodation portion by being inserted along an axial direction.

This may suppress occurrence of separation and clearance between the plurality of split cores in a circumferential direction.

In addition, occurrence of clearance in the plurality of split cores in a radial direction may be suppressed.

In an implementation of the present disclosure, the plurality of split cores is implemented as being four split cores.

In one embodiment, the plurality of split cores is configured to include twelve teeth parts.

In one embodiment, the plurality of split cores are configured to be coupled to each other by welding This may result in enhancement of coupling force in the plurality of split cores.

A plurality of welding parts are provided on an outer circumference of the plurality of split cores coupled to each other in a ring shape.

As described above, in accordance with embodiments of the present disclosure, a stator core includes a plurality of split cores, each of the plurality of split cores includes a plurality of yoke parts and a plurality of teeth parts, and a cutting part cut in a radial direction and a connection part for connecting two yoke parts adjacent to each other to be relatively rotatable. Thus, a size of remaining scraps when the plurality of split cores are molded may be reduced.

In addition, as the plurality of split cores are connected by the connection part, reliability of concentricity of the plurality of teeth parts may be enhanced.

In addition, an air gap between the stator core and the rotor may be kept even, thereby enhancing output from the motor.

In addition, as a mutual contact area of the plurality of yoke parts is provided with fitting coupling portions fit to be coupled to each other along a circumferential direction, coupling strength of the plurality of split cores in a radial direction may be enhanced.

In addition, when the plurality of split cores are molded into a circular arc shape, a spring-back phenomenon may be reduced, and thus, the molding may be facilitated.

In addition, as the cutting part is configured to include a parallel section parallel with a side surface portion of the teeth parts and an inclined section provided to be inclined against the parallel section, generation of scraps may be suppressed.

In addition, occurrence of failure during forming of the plurality of yoke parts may be suppressed.

In addition, forming the plurality of split cores include forming a first split core in which the plurality of yoke parts are arranged along a first long side portion of an electric steel plate having a rectangular shape and a second split core in which the plurality of yoke parts are arranged along a second long side portion of the electric steel plate, and a plurality of teeth parts in the first split core and a plurality of teeth parts in the second split core oppose each other and are alternately arranged. Thus, remaining scraps from the electric steel plate may be minimized.

In addition, a protrusion and a protrusion accommodation portion fit to be coupled to each other along a circumferential direction may respectively include an inner side surface formed with a circular arc shape having a first radius and an outer side surface formed with a circular arc shape having a second radius greater than the first radius. Thus, remaining amount of scraps may be suppressed and coupling strength in a radial direction may be enhanced.

In addition, since an inner side surface of the yoke parts and an inner side surface of the teeth parts have a same curvature radius, the inner side surface of the yoke parts and the inner side surface of the teeth parts may be molded simultaneously, thereby minimizing generation of scraps.

In addition, since the plurality of split cores include a coupling protrusion and a coupling protrusion accommodation portion coupled to each other along a circumferential direction, coupling strength in a radial direction may be enhanced.

In addition, the coupling protrusion accommodation portion is provided with an opening open toward the coupling protrusion, and the coupling protrusion includes a maximum width greater than a width of the opening and is coupled into the coupling protrusion accommodation portion by being inserted along an axial direction. Thus, separation and clearance between the plurality of split cores both in a circumferential direction and in a radial direction may be suppressed.

DETAILED DESCRIPTION

Figure 1:
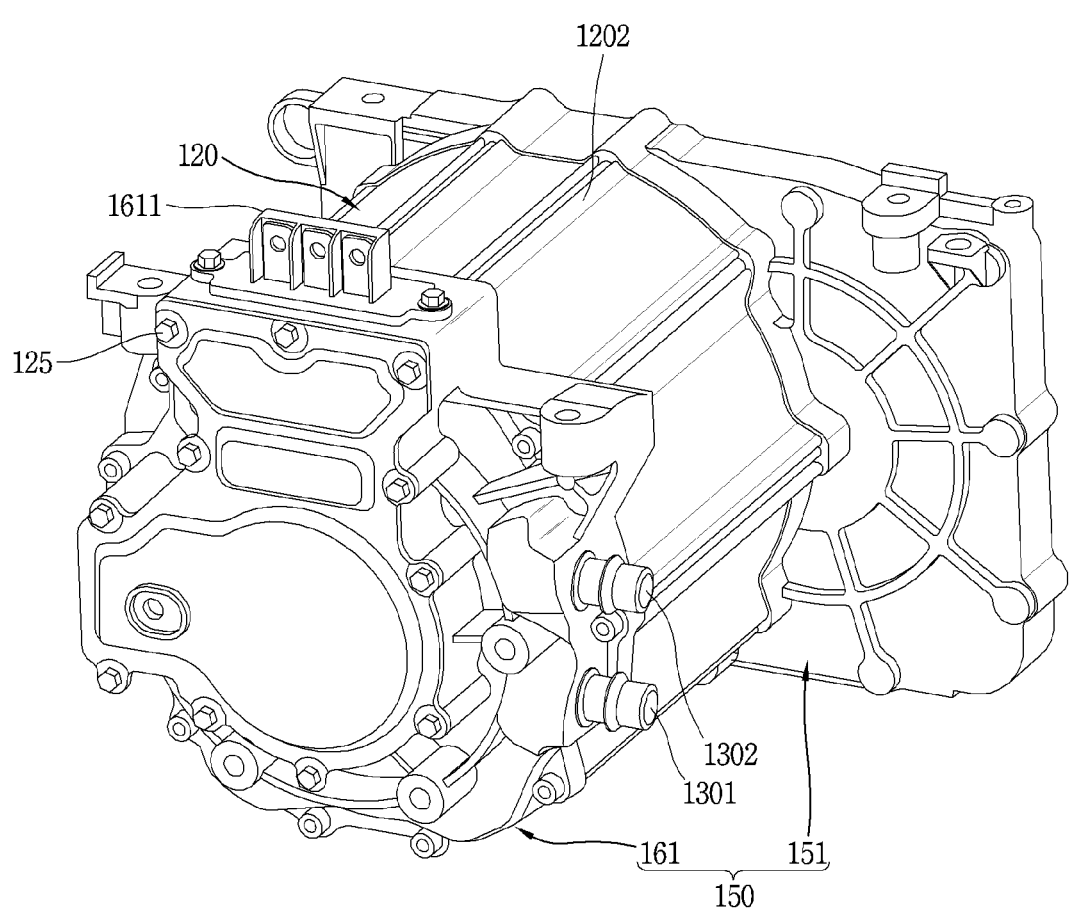
FIG. 1 is a perspective view of a motor according to an implementation of the present disclosure.

Hereinafter, implementations of the present disclosure will be described in detail with reference to the accompanying drawings. For the sake of brief description with reference to the drawings, the same or equivalent components will be provided with the same reference numerals, and description thereof will not be repeated. A singular representation used herein may include a plural representation unless it represents a definitely different meaning from the context. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

Figure 2:
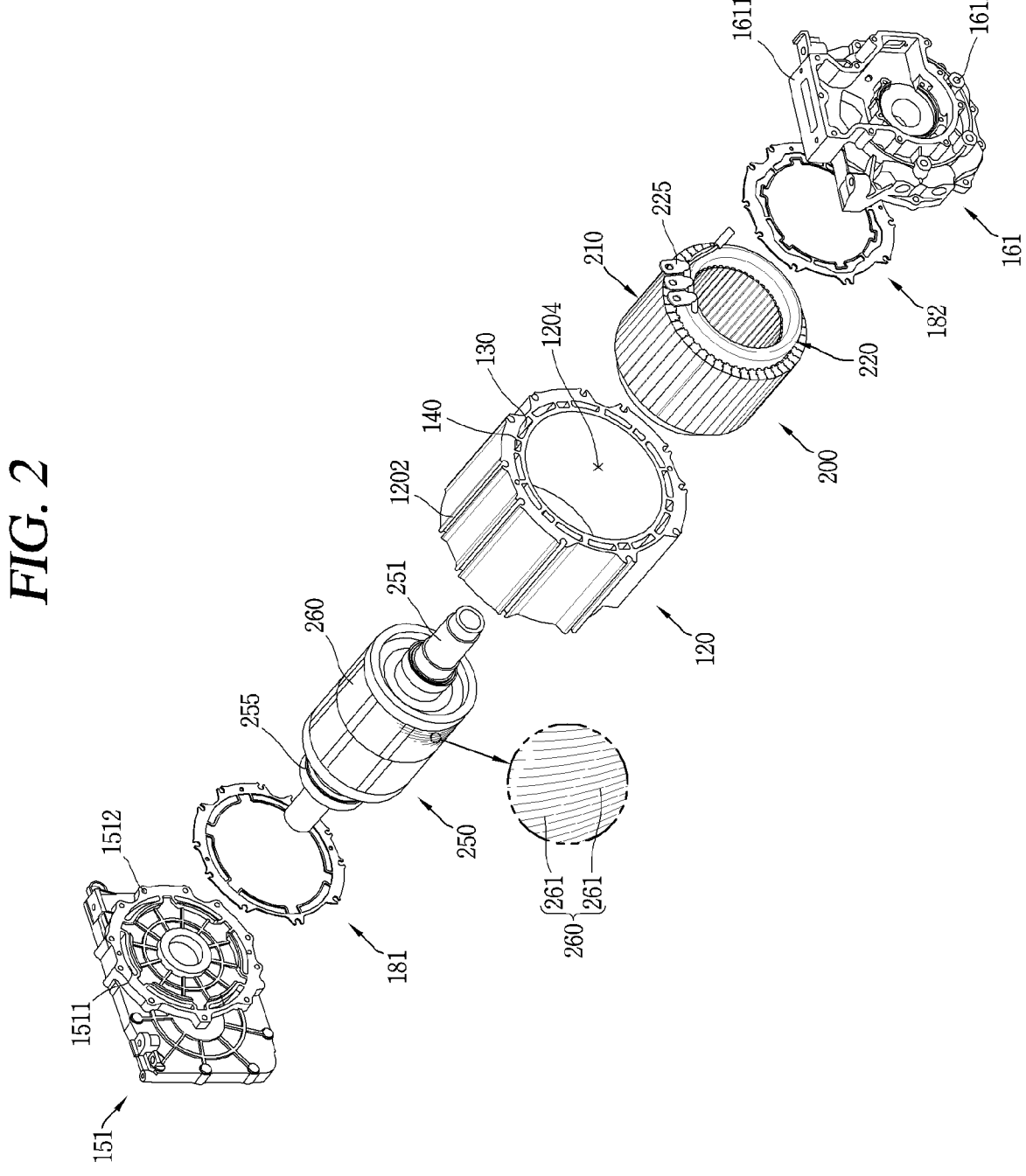
FIG. 2 is an exploded perspective view of the motor of FIG. 1.
Figure 3:
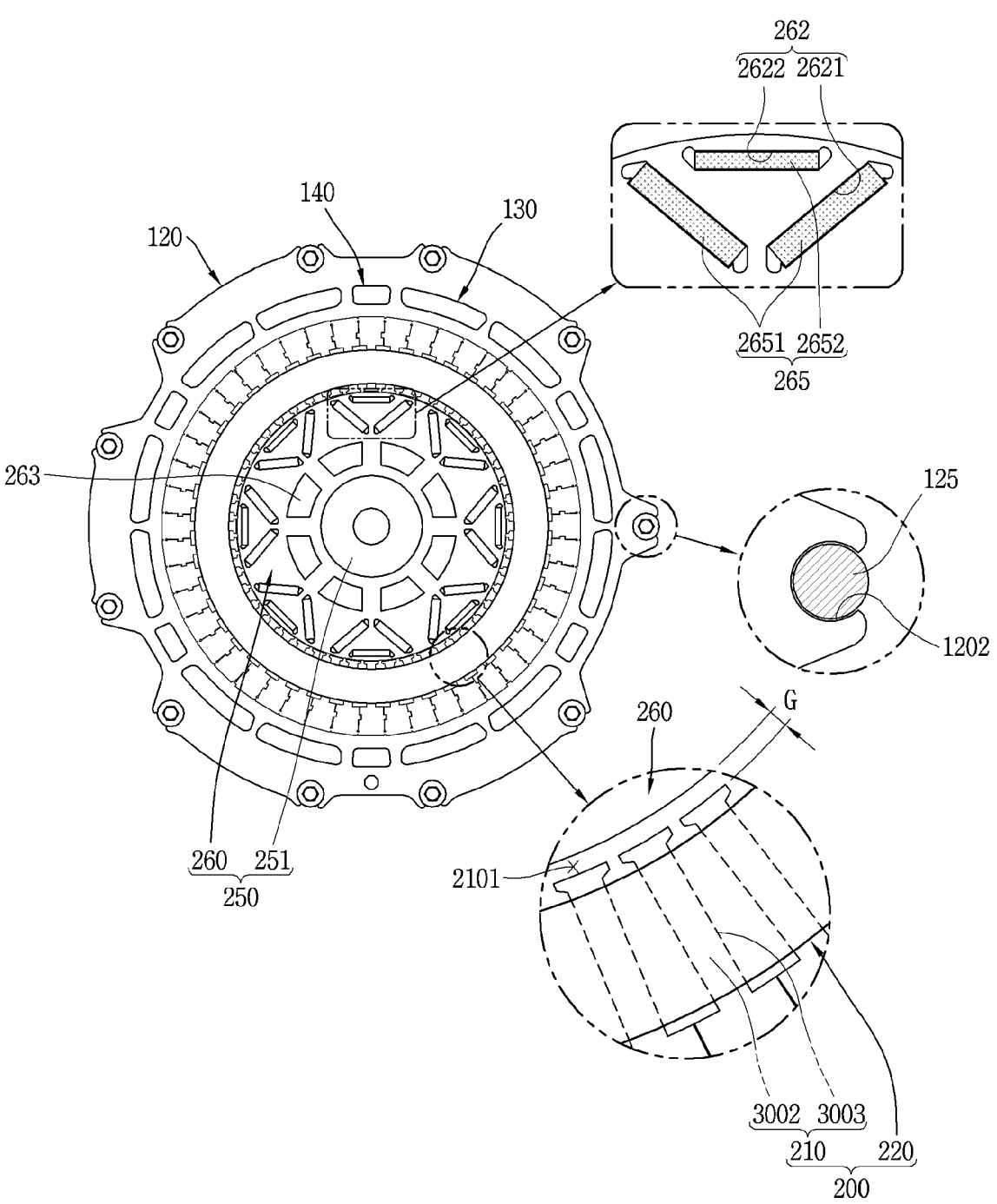
FIG. 3 is a diagram illustrating inside of the motor of FIG. 2.

FIG. 1 is a perspective view of a motor according to an implementation of the present disclosure. FIG. 2 is an exploded perspective view of the motor of FIG. 1. FIG. 3 is a diagram illustrating inside of the motor of FIG. 2. As illustrated in FIGS. 1 to 3, the motor in this implementation includes a stator 200 and a rotor 250.

A housing 110 is included outside the stator 200.

The housing 110 includes an accommodation space 1204 in which the stator 200 is accommodated.

In detail, the housing 110 includes a housing body 120 provided with the accommodation space 1204 therein, and a cover 150 coupled to both ends of the housing body 120.

The housing 120 is formed, for example, to have a cylindrical shape with both ends open.

The housing 110, the stator 200, and the rotor 250 may be coupled to a vehicle and implemented as a driving source (or an auxiliary power source) of the vehicle to provide power to the vehicle.

The cover 150 includes, for example, a front cover 151 coupled to a front end of the housing body 120, and a rear cover 161 coupled to a rear end of the housing body 120.

In this implementation, with reference to FIG. 1, a left end of the housing body 120 refers to the rear end, and a right end of the housing body 120 refers to the front end.

In this implementation, the front cover 151 is implemented to have a rectangular plate shape to be fastened to a gear box which is not shown in the drawing.

The rear cover 161 is provided with a terminal block 1611 coupled to a plurality of terminals 225 configured to connect the stator 200 (a stator coil 220 to be described later) to a power source.

An outer surface of the housing 120 is provided with fastening member accommodation portions 1202 in which a plurality of fastening members 125 configured to fasten the front cover 151 to the rear cover 161 are accommodated, respectively.

In one implementation, the housing 110 includes cooling water flow paths 130 through which cooling water may move.

The cooling water flow paths 130 may be, for example, provided through the housing body 120 along an axial direction.

The housing 110 includes air flow paths 140 through which heat is exchanged (cooled) as air moves.

The cooling water flow paths 130 may be disposed apart from each other along a circumferential direction of the housing 110. The air flow paths 140 may be arranged, for example, between the cooling water flow paths 130. Thus, when air moves along the air flow paths 140, the air may be cooled by the cooling water flow paths 130.

The front cover 151 and the rear cover 161 are respectively provided with a communication part 1511 for communicating with the cooling water flow paths 130 penetrated through the housing body 120 in an axial direction.

The cover 150 (the rear cover 161) is provided with a cooling water inlet portion 1301 into which the cooling water flows, and a cooling water outlet portion 1302 from which the cooling water is discharged.

Although not illustrated in detail, the cooling water inlet portion 1301 and the cooling water outlet portion 1302 may be connected to a radiator of the vehicle. Thus, cooling water cooled in the radiator may flow into the cooling water inlet portion 1301, and when a temperature of the cooling water rises due to heat exchange in the housing 110, the cooling water may be discharged through the cooling water outlet portion 1302, and move to the radiator to be cooled.

A front gasket 181 configured to suppress a leak of the cooling water is included between the housing body 120 and the front cover 151.

A rear gasket 182 is inserted and coupled between the housing body 120 and the rear cover 161 to suppress a leak of the cooling water.

The front gasket 181 and the rear gasket 182 are arranged at an edge of the cooling water flow paths 130 to suppress the cooling water in the cooling water flow paths 130 from leaking out.

The rotor 250 is configured to, for example, include a rotating shaft 251 and a rotor core 260 coupled to the rotating shaft 251.

The rotor core 260 is provided, for example, by stacking an electric steel plate 261 using an insulating method.

The rotating shaft 251 is implemented to protrude from both sides of the rotor core 260.

The both sides of the rotor 260 are respectively provided with a bearing 255 configured to rotatably support the rotating shaft 251.

The rotor core 260 includes a plurality of permanent magnets 265 as illustrated in FIG. 3.

The rotor core 260 includes a permanent magnet inserting portion 262 into which the permanent magnets 265 are inserted.

The permanent magnet inserting portion 262 may be provided through the rotor core 260 in an axial direction.

The permanent magnets 265 are configured, for example, such that different magnetic poles (N poles and S poles) are alternately arranged along a circumferential direction of the rotor core 260.

The permanent magnets 265 are configured, for example, to respectively include first permanent magnets 2651 coupled to the rotor core 260 to have a "V" shape, and a second permanent magnet 2652 arranged between the first permanent magnets 2651.

The first permanent magnets 2651 and the second permanent magnet 2652 are respectively implemented to have a rectangular parallelepiped shape with a small thickness.

The permanent magnet inserting portion 262 includes first permanent magnet inserting portions 2621 into which the first permanent magnets 2651 are inserted, and a second permanent magnet inserting portion 2622 into which the second permanent magnet 2652 is inserted.

The first permanent magnet inserting portions 2621 and the second permanent magnet inserting portion 2622 are configured, for example, to respectively penetrate through the rotor core 260 in an axial direction.

Here, an axial direction means a direction parallel with a longitudinal direction of the rotating shaft 251.

The rotor core 260 is provided with a plurality of through portions 263 penetrating therethrough in an axial direction.

The through portions 263 are, for example, arranged apart from each other around the rotating shaft 251 along a circumferential direction.

Thus, air from one side of the rotor 260 may move to another side along an axial direction through the through portions 263.

Although not illustrated in detail, the rotor 250 includes a plurality of blades configured to facilitate movement of air during rotation, and air inside the housing 110 may move through the through portions 263 to be circulated along the air flow paths 140 to be thereby cooled.

The stator 200 includes a stator core 210 and a stator coil 220 wound around the stator core 210.

The stator core 210 includes a rotor accommodation hole 2101 configured to rotatably accommodate the rotor 250 therein with a certain air gap G between the rotor 250 and the stator core 210.

The stator core 210 includes a plurality of teeth parts 3002 and slots 3003 along a circumferential direction.

The teeth parts 3002 and the slots 3003 are alternately provided along a circumferential direction.

In one embodiment, forty eight slots 3003 and forty eight teeth parts 3002 may be implemented, respectively, however the present disclosure is not limited thereto.

A case when the stator core 210 is implemented to include the forty eight slots 3003 and the forty eight teeth parts 3002 is provided as an example. However, this is only an example, and the present disclosure is not limited thereto.

In this implementation, the stator coil 220 is configured to include, for example, a plurality of phase coils (a u-phase coil, a v-phase coil and a w-phase coil) connected to each phase power (a u-phase, a v-phase, a w-phase) of three-phase AC power.

In this implementation, the stator coil 220 may be implemented in a distributed winding type in which a wire having a circular cross-section, i.e., a so-called round wire is wound via the slots 3003.

Terminals 225 of respective phases are provided at one side of the stator coil 220 to be connected to the three-phase AC power.

The terminals 225 are respectively connected to an external power source in the terminal block 1611.

Figure 4:
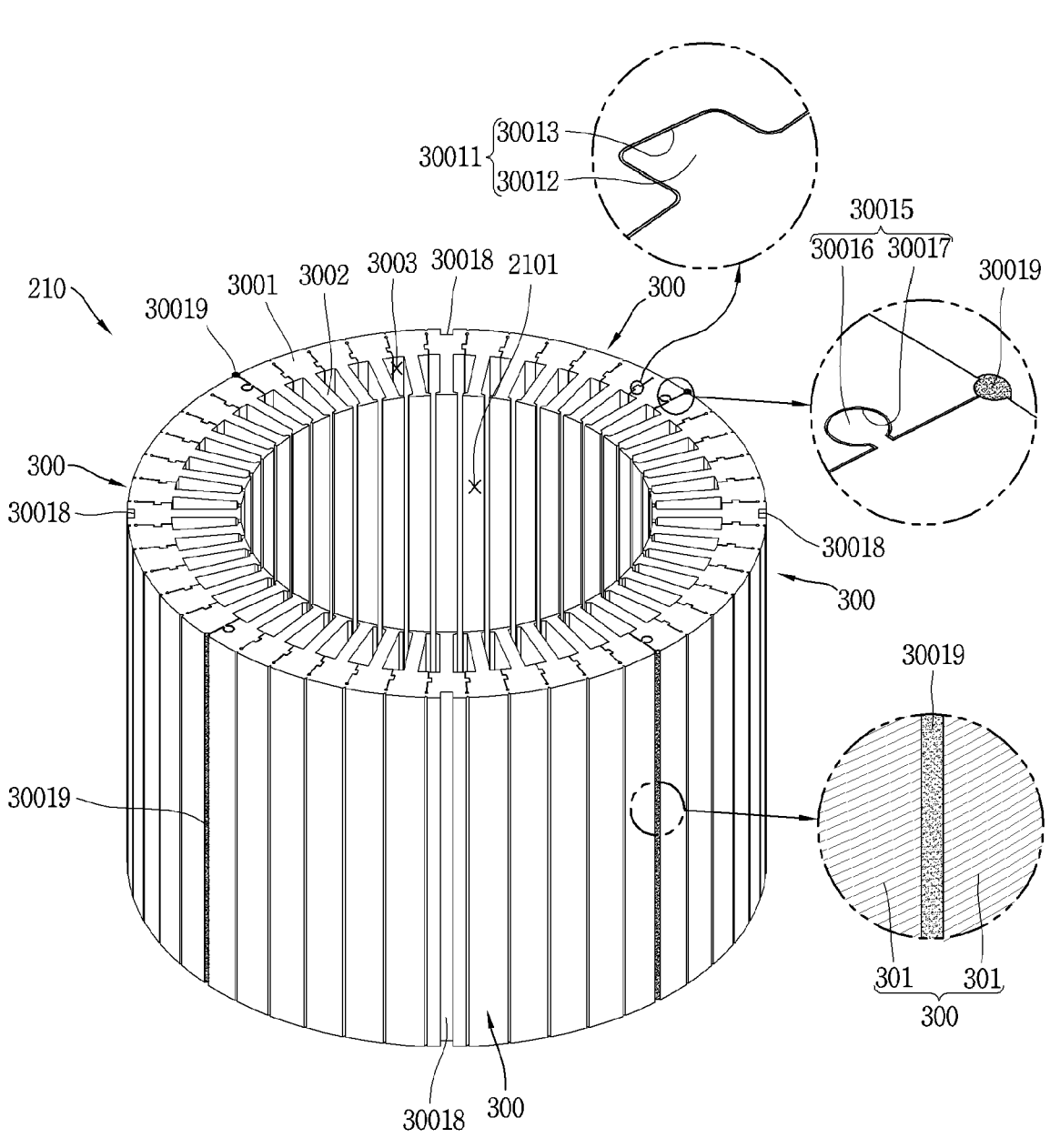
FIG. 4 is a perspective view of a stator core of FIG. 3.
Figure 5:
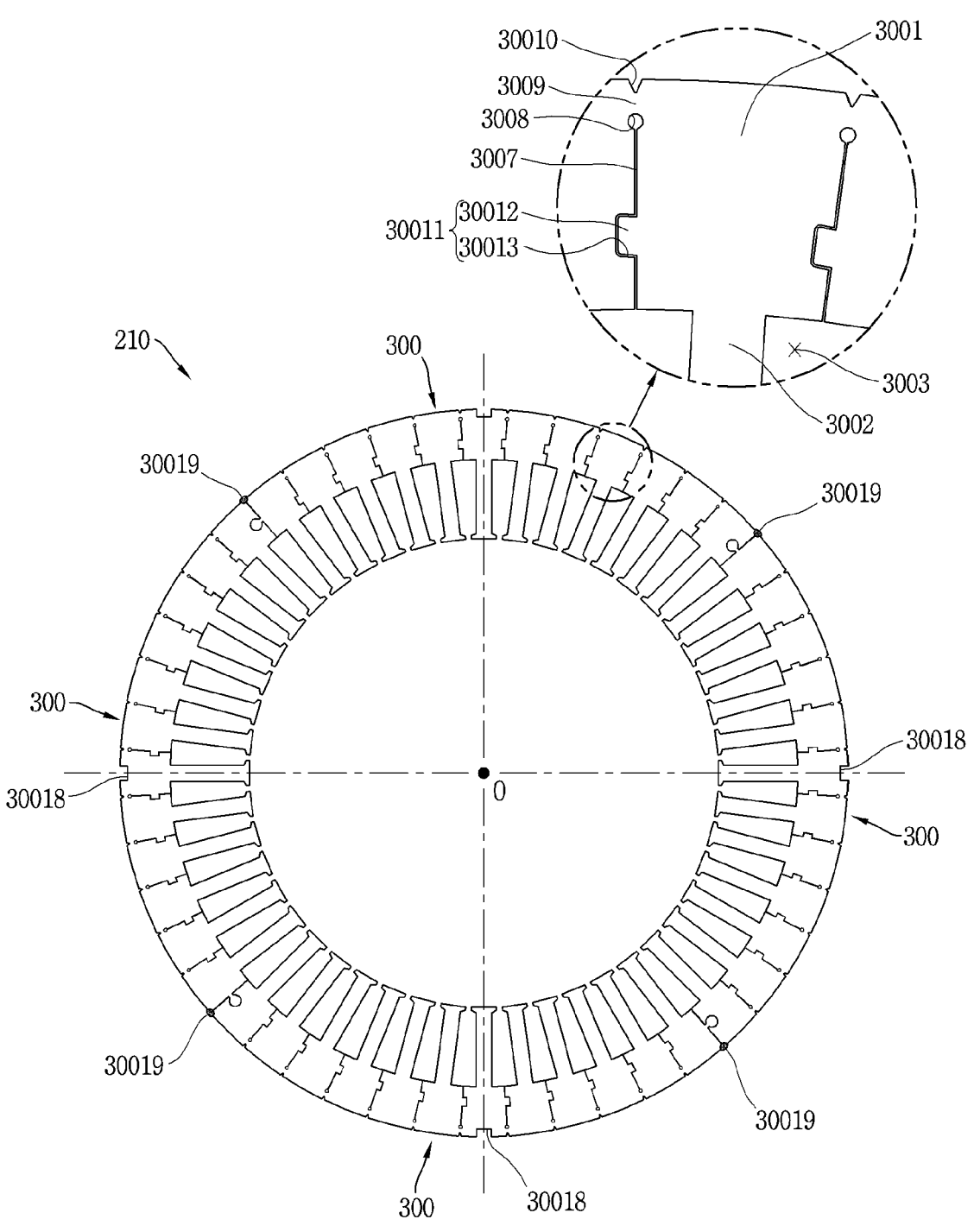
FIG. 5 is a planar view of the stator core of FIG. 4.
Figure 6:
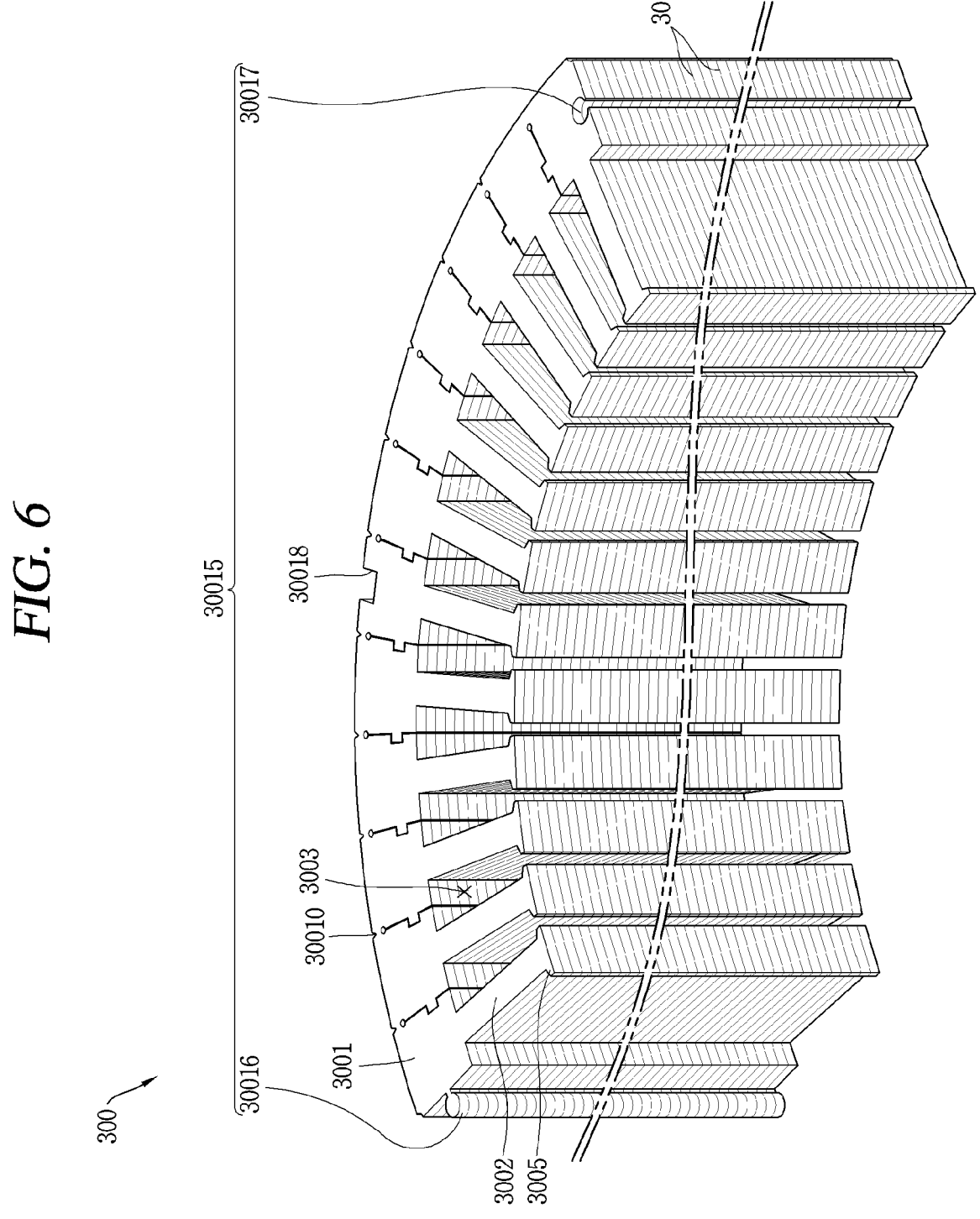
FIG. 6 is a perspective view of a split core of FIG. 4.
Figure 7:
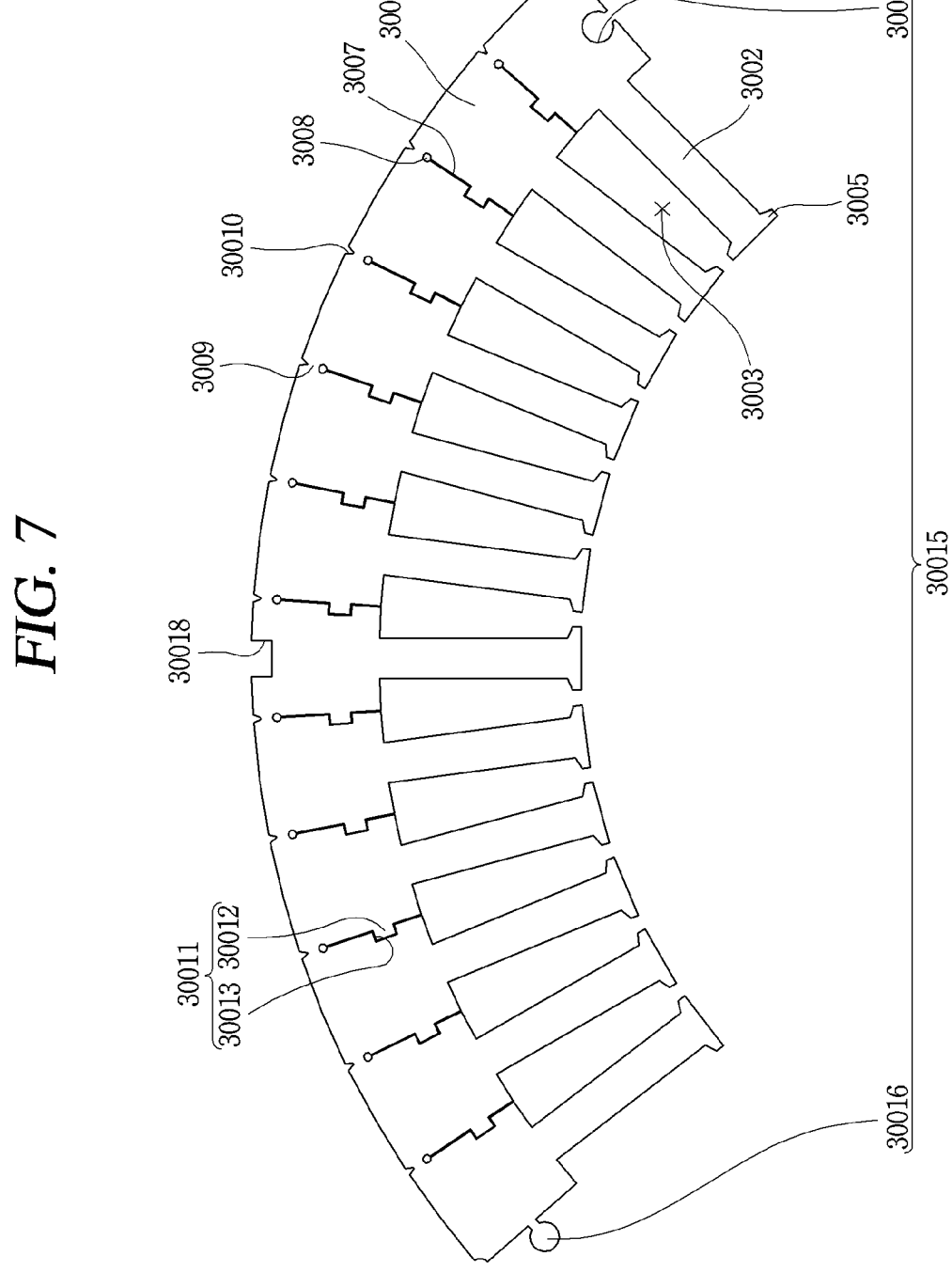
FIG. 7 is a planar view of the split core of FIG. 6.

FIG. 4 is a perspective view of the stator core 210 of FIG. 3. FIG. 5 is a planar view of the stator core 210 of FIG. 4. FIG. 6 is a perspective view of a split core of FIG. 4. FIG. 7 is a planar view of the split core of FIG. 6. As illustrated in FIGS. 4 and 5, the stator core 210 is configured to include a plurality of split cores 300 coupled to each other into a ring shape along a circumferential direction.

In this implementation, four split cores 300 are provided.

An internal angle between both ends of the split cores 300 along a circumferential direction is configured to form an angle of 90 degrees.

As illustrated in FIGS. 6 and 7, the split cores 300 are configured to include a plurality of yoke parts 3001 positioned adjacent to each other, a plurality of teeth parts 3002 respectively protruding from the yoke parts 3001 along a radial direction, a cutting part 3007 cut between the yoke parts adjacent to each other in a radial direction, and a connection part 3009 for connecting the adjacent yoke parts 3001 to rotate relative to each other.

In one implementation, the split cores 300 are configured to respectively include twelve yoke parts 3001 and twelve teeth parts 3002, however the present disclosure is not limited thereto.

In one implementation, an internal angle between both ends of each of the yoke parts 300 is configured to form an angle of 7.5 degrees.

The teeth parts 3002 respectively protrude from inner surfaces of the respective yoke parts 3001 along a radial direction.

Here, a center of each of the yoke parts 3001 with respect to a circumferential direction and a center of each of the teeth parts 3002 with respect to the circumferential direction are respectively aligned.

The center of the teeth parts 3002 along a circumferential direction is aligned with the center of the yoke parts 3001 in a circumferential direction and a center of the split cores 300.

The yoke parts 3001 are provided to have a width in a circumferential direction to be gradually reduced inwardly along a radial direction.

The teeth parts 3002 are provided to have a same width along a circumferential direction.

Inner ends of the teeth parts 3002 are provided with shoes 3005 respectively protruding laterally outward along a circumferential direction.

The slots 3003 are respectively provided between teeth parts 3002 consecutively provided along a circumferential direction of the split cores 300.

The slots 3003 are provided, for example, to have a width to be gradually reduced inwardly along a radial direction.

The split cores 300 are configured to respectively include eleven slots 3003, however the present disclosure is not limited thereto.

One slot 3003 is provided between two split cores 300 consecutively arranged along a circumferential direction.

In one implementation, since the four split cores 300 are provided, forty four slots 3003 are arranged, and four slots 3003 are arranged in coupling areas of the four split cores 300. Thus, the stator core 210 in this implementation includes forty eight slots 3003 in total.

The split cores 300 are configured to be coupled to each other along a circumferential direction of the stator.

Coupling portion 30015 configured to be coupled to each other are provided at both ends of the split cores 300 along a circumferential direction.

Each of the coupling portions 30015 is configured to include a coupling protrusion 30016 protruding on one of contact surfaces along a circumferential direction, and a coupling protrusion accommodation portion 30017 arranged on another of the contact surfaces and configured to accommodate a corresponding coupling protrusion 30016 of an adjacent split core 300 therein.

In one implementation, the coupling protrusion 30016 is arranged to protrude from a left end of the split cores 300, and the coupling protrusion accommodation portion 30017 is provided to be recessed into a right end of the split cores 300.

In one implementation, the coupling protrusion 30016 may be configured, for example, to include a cross-section having a shape of a circular arc.

The coupling protrusion 30016 is provided such that a distance between a center of the circular arc and a lateral end of the yoke part 3001 at which the coupling protrusion is connected is less than a radius of the circular arc.

The coupling protrusion accommodation portion 30017 is provided to include an opening which is open outwardly toward a circumferential direction of the stator.

The coupling protrusion accommodation portion 30017 is implemented to have a circular arc shape having a diameter greater than a width of the opening.

The coupling protrusions 30016 are configured to have an outer diameter greater than a width of the openings of the coupling protrusion accommodation portions 30017.

The coupling protrusion accommodation portion 30017 may extend along the split cores 300 in an axial direction.

By doing so, the coupling protrusion 30016 is inserted and coupled into the coupling protrusion accommodation portion 30017 at one side in an axial direction.

In this configuration, the coupling protrusion 30016 and the coupling protrusion accommodation portion 30017 may prevent separation of the split cores 300 in a circumferential direction and a radial direction.

Mutual contact areas between the four split cores 300 coupled into a ring shape may be integrally coupled to each other by welding.

A welding portion is provided respectively to axially extend on outer circumferences of the mutual contact areas of the four split cores 300.

Figure 8:
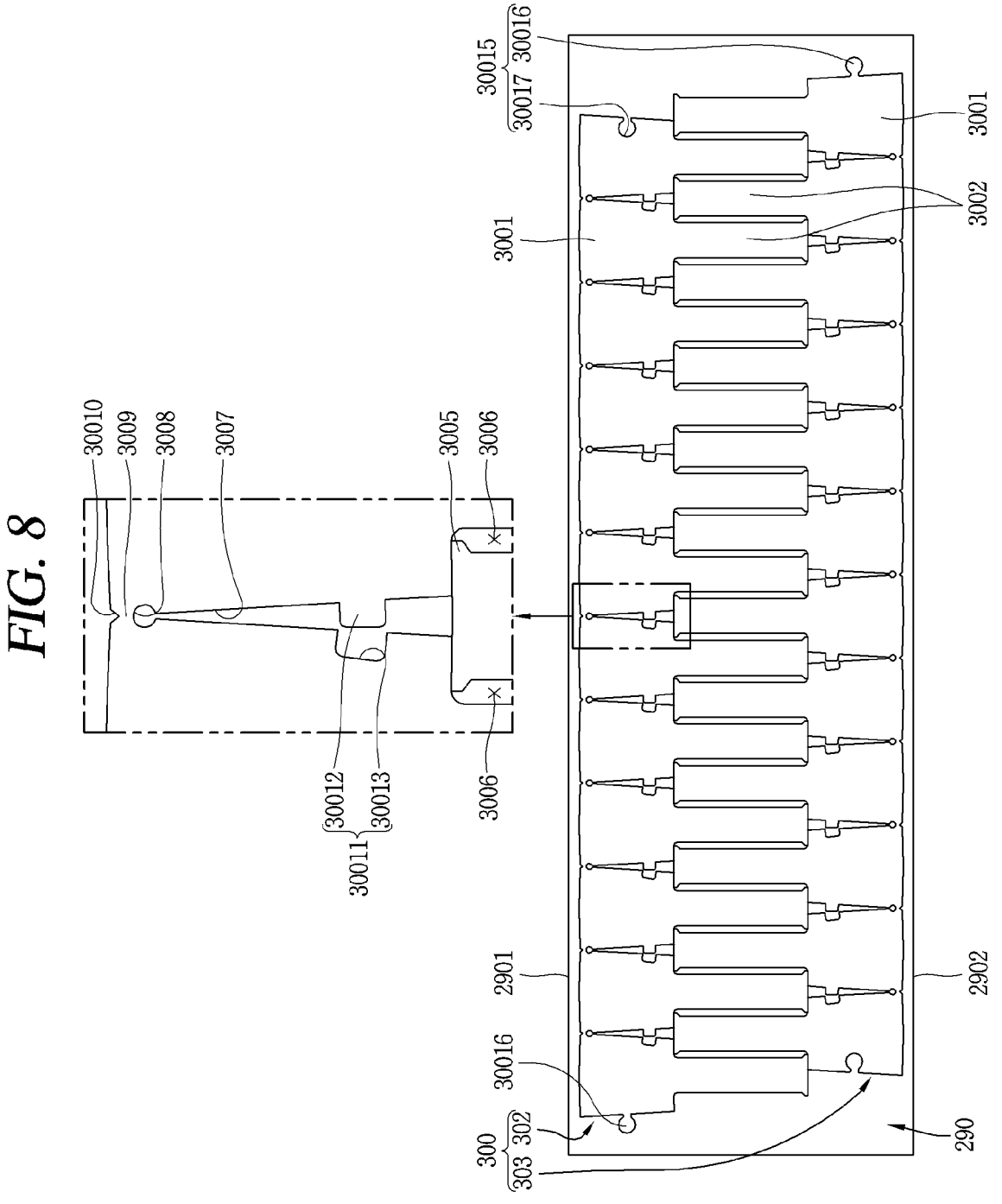
FIG. 8 is a diagram for explaining a process of manufacturing a split core of the stator core of FIG. 3.
Figure 9:
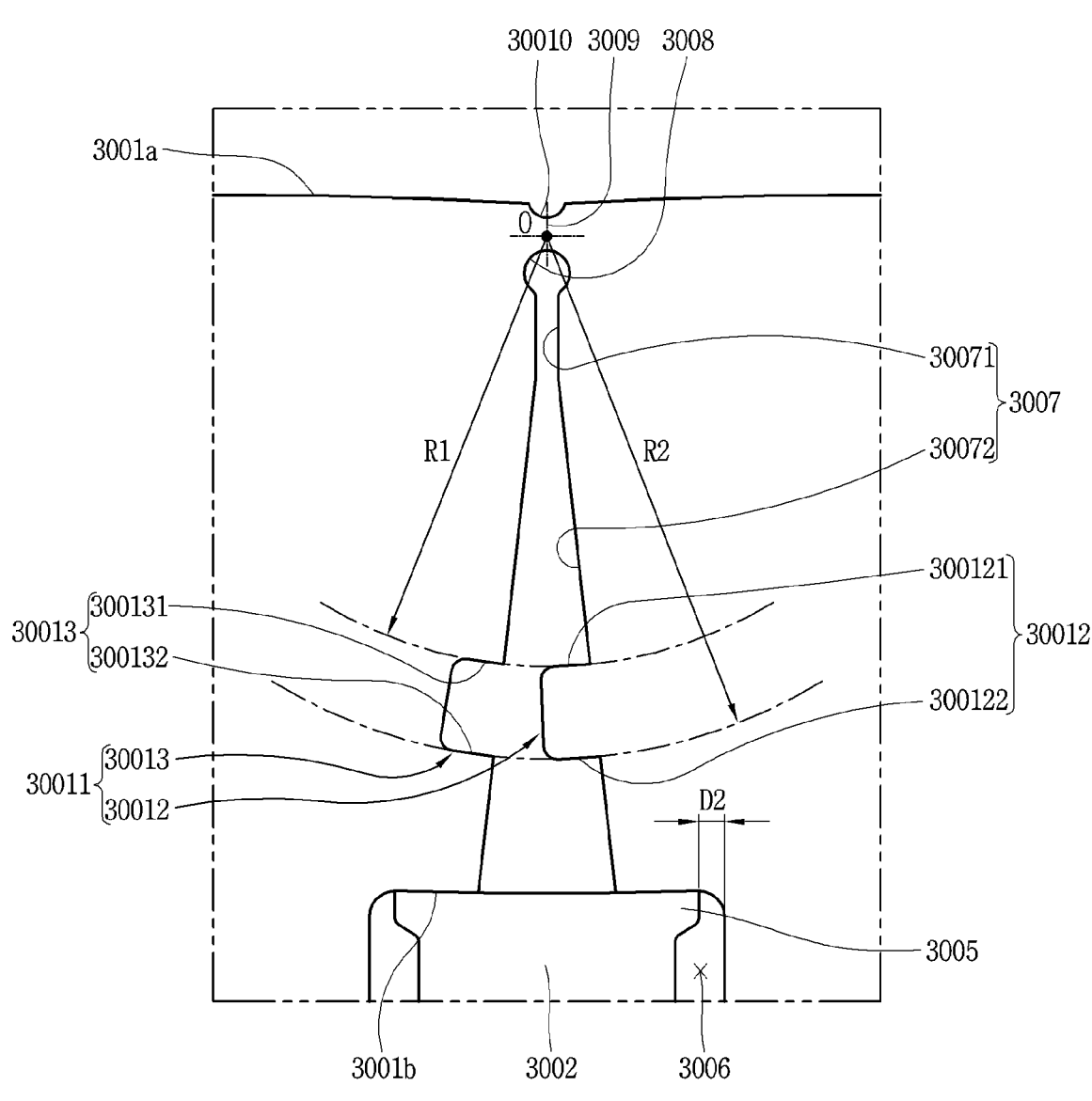
FIG. 9 is an enlarged view illustrating a main part of FIG. 8.
Figure 10:
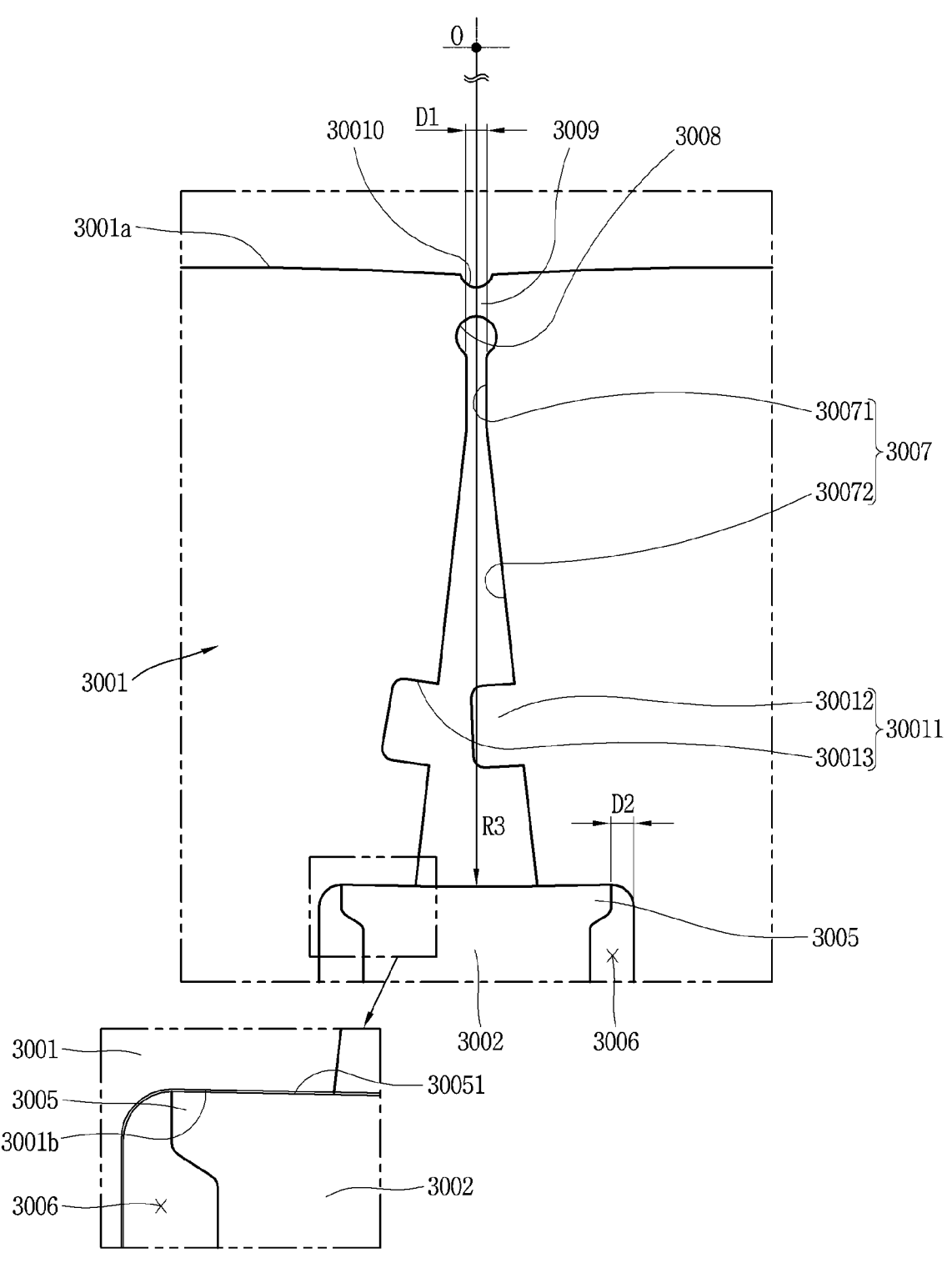
FIG. 10 is an enlarged view of a region of a cutting part of FIG. 9.

FIG. 8 is a diagram for explaining a process of manufacturing the split cores 300 of the stator core 210 of FIG. 3. FIG. 9 is an enlarged view of a main part of FIG. 8. FIG. 10 is an enlarged view of a region of a cutting part of FIG. 9. As illustrated in FIG. 8, in one implementation, the split cores 300 are manufactured by molding two split cores 300 in a base material 290 having a rectangular plate shape.

The two split cores 300 are respectively molded in a state where spacing between the yoke parts 3001 is laterally expanded.

By doing so, a size of the base material 290 may be reduced, and generation of scraps after molding of the two split cores 300 may be minimized.

The base material 290 is implemented as an electromagnetic steel plate or an electric steel plate (hereinafter referred to as an "electric steel plate").

The base material 290 includes a first long side portion 2901 and a second long side portion 2902 parallel with each other.

The split cores 300 includes a first split core 302 in which the yoke parts 3001 are linearly arranged along the first long side portion 2901 of the base material 290, and a second split core 303 in which the yoke parts 3001 are linearly arranged along the second long side portion 2902 parallel with the first long side portion 2901.

Here, the teeth parts 3002 of the second split core 303 are arranged between the teeth parts 3002 of the first split core 302, respectively.

By doing so, a width (a size of a short side portion) of the base material 290 may be reduced, and scraps after molding of the first split core 302 and the second split core 303 may be minimized.

The first split core 302 and the second split core 303 are arranged to be spaced apart from the edges of the first long side portion 2901 and the second long side portion 2902 of the base materials by a preset distance, respectively.

The yoke parts 3001 of the first and second split cores 302 and 303 include an outer surface portion 3001a forming an outer circumference of the stator core 210, and an inner surface portion 3001b provided inwardly from the outer surface portion 3001a along a radial direction of the stator core.

The yoke parts 3001 of the first and second split cores 302 and 303 include lateral side surface portions which are in contact with each other along a circumferential direction of the stator core.

The lateral side surface portions of the split cores are to be aligned along a radial direction of the stator core 210.

The yoke parts 3001 of the first and second split cores 302 and 303 are provided to have a circumferential width to be gradually reduced inwardly along a radial direction of the stator core.

The inner surface portion 3001b of each of the yoke parts 3001 extends to provide a teeth part 3002 protruding inwardly along a radial direction of the stator core.

The teeth parts 3002 are provided to have a constant width in a circumferential direction.

Ends of the teeth parts 3002 are provided with shoes 3005 respectively laterally protruding outwardly along a circumferential direction.

As illustrated in FIG. 9, two adjacent yoke parts 3001 are connected to each other by a connection part 3009 to hingedly rotate relative to each other.

Notches 30010 are respectively provided adjacent to the connection part 3009 along a radial direction of the stator core.

Each of the notches 30010 is provided to be recessed inwardly from an outer surface portion 3001a of the yoke parts 3001 (to be an outer circumference of the stator core 310) along a radial direction.

By doing so, after the molding of the split cores 300, when the split cores 300 are to be bent to have a circular arc shape, the bending may be facilitated by the notch 30010.

The cutting part 3007 cut in a radial direction is included between adjacent yoke parts.

Thus, the split cores 300 molded in a linearly cut state may be bent to form a circular arc shape of the stator core.

For example, as illustrated in FIG. 10, the cutting part 3007 may be configured to include a parallel section 30071 provided in parallel with a side surface portion of the teeth parts 3002, and an inclined section 30072 extending at an angle from the parallel section 30071.

In an embodiment, the parallel section 30071 may be provided, for example, to have a width 1.2 to 1.5 times a thickness of the electric steel plate (the base material 290).

Thus, when the split cores 300 are molded, deformation of the yoke parts 3001 is prevented, and thus, occurrence of failure may be suppressed.

In one implementation, an internal angle between sides of adjacent inclined sections 30072 may be 7.5 degrees.

A communication hole 3008 for communicating with the cutting part 3007 is provided at one side of the connection part 3009 (an inner side in a radial direction in the drawing).

Thus, when the cutting part 3007 is formed, generation of damage and deformation of the connection part 3009 may be suppressed.

The communication hole 3008 may be formed through the yoke parts.

The notches 30010 are provided at an outer side of the connection part 3009 and the communication hole 3008 is provided at an inner side of the connection part 3009.

A side of the communication hole 3008 is open to lead into the parallel section 30071.

As illustrated in FIG. 9, a mutual contact area of adjacent yoke parts 3001 is provided with fitting coupling portions 30011 fit to be coupled to each other.

Thus, when a circular arc shape of the split cores 300 is molded, coupling strength in a radial direction may be enhanced.

In addition, occurrence of separation between the split cores 300 in a radial direction may be suppressed.

The fitting coupling portions 30011 are provided, in one example, to include a protrusion 30012 protruding from one yoke part 3001 along a circumferential direction, and a protrusion accommodation portion 30013 provided to be recessed into an adjacent yoke part to accommodate the protrusion 30012.

Here, the protrusion 30012 and the protrusion accommodation portion 30013 are provided to include first side surfaces 300121 and 300131, respectively, shaped in a circular arc shape having a center at the connection portion 3009 with a first radius R1, and second side surfaces 300122 and 300132, respectively, shaped in a circular arc shape having a center at the connection portion 3009 with a second radius R2 greater than the first radius R1.

Thus, a size of scraps remaining when a circular arc shape of the split cores 300 is molded may be reduced.

The first side surfaces 300121 and 300131 are arranged nearer to the outer surface portion 3001a of the yoke parts 3001 compared to the second side surfaces 300122 and 300132.

The second side surfaces 300122 and 300132 are arranged inwardly compared to the first side surfaces 300121 and 300131 with respect to a radial direction of the split cores 300.

As illustrated in FIG. 10, the inner surface portion 3001b of the yoke parts 3001 and an end portion 30051 of the teeth part 3002 of an oppositely positioned yoke part may be provided along a same line.

Thus, when the split cores 300 are formed, remaining scrap material may be suppressed.

In detail, the inner surface portion 3001b of each of the yoke parts 3001 may be implemented in a circular arc shape having a center at the connection part 3009 with a third radius R3 of a preset size.

The inner surface portions 3001b of each of the yoke parts 3001 has a circular arc shape convex toward a center of the split cores 300.

The end portion 30051 of each of the teeth parts 3002 may have a circular arc shape that is convex toward a center 0 of the split cores 300 (center of the stator core).

A piercing portion or a through part 3006 (hereinafter referred to as a "through portion" 3006) is provided between the teeth parts 3002 of a first split core 302 and the teeth parts 3002 of an adjacent second split core 303.

In this implementation, since the teeth parts 3002 have a same width, the through portions 3006 are provided to have a same width.

Each of the through parts 3006 may be configured such that a space D2 between the through part 3006 and an end of the shoe 3005 in a circumferential direction is 1.2 times or greater than a thickness of the base material 290 (the electric steel plate).

Thus, when the shoe 3005 is molded, deformation of the shoe 3005 is prevented, and thus, occurrence of failure may be suppressed.

In one implementation, the protrusion 30012 is not provided at an end of the split core where the coupling protrusion 30016 is provided (a left end in FIG. 8).

In addition, the protrusion accommodation portion 30013 is not provided at an end of the split core where the coupling protrusion accommodation portion 30017 is provided (a right end in FIG. 8).

Figure 11:
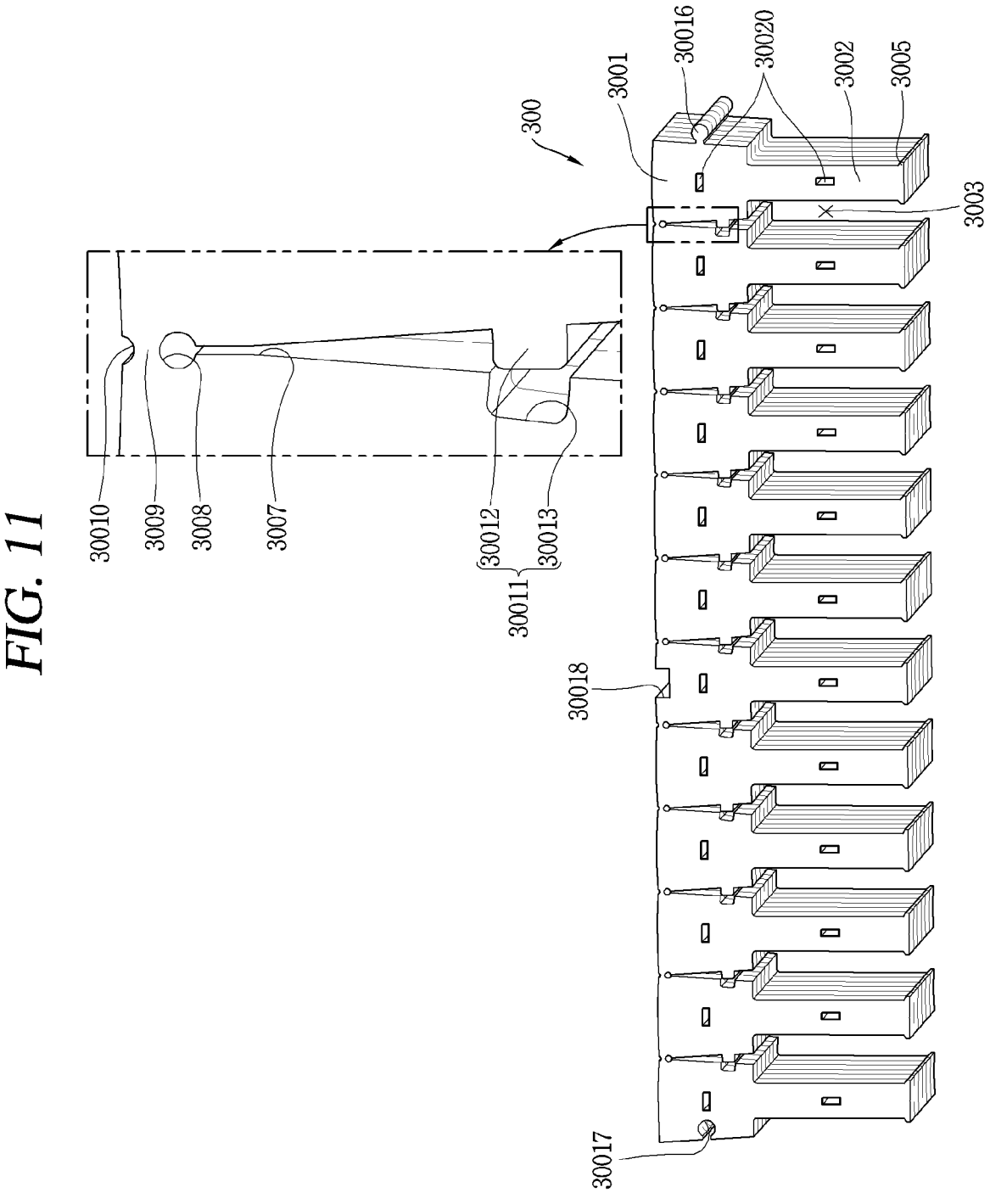
FIG. 11 is a perspective view of the split core of FIG. 6 before bending.
Figure 12:
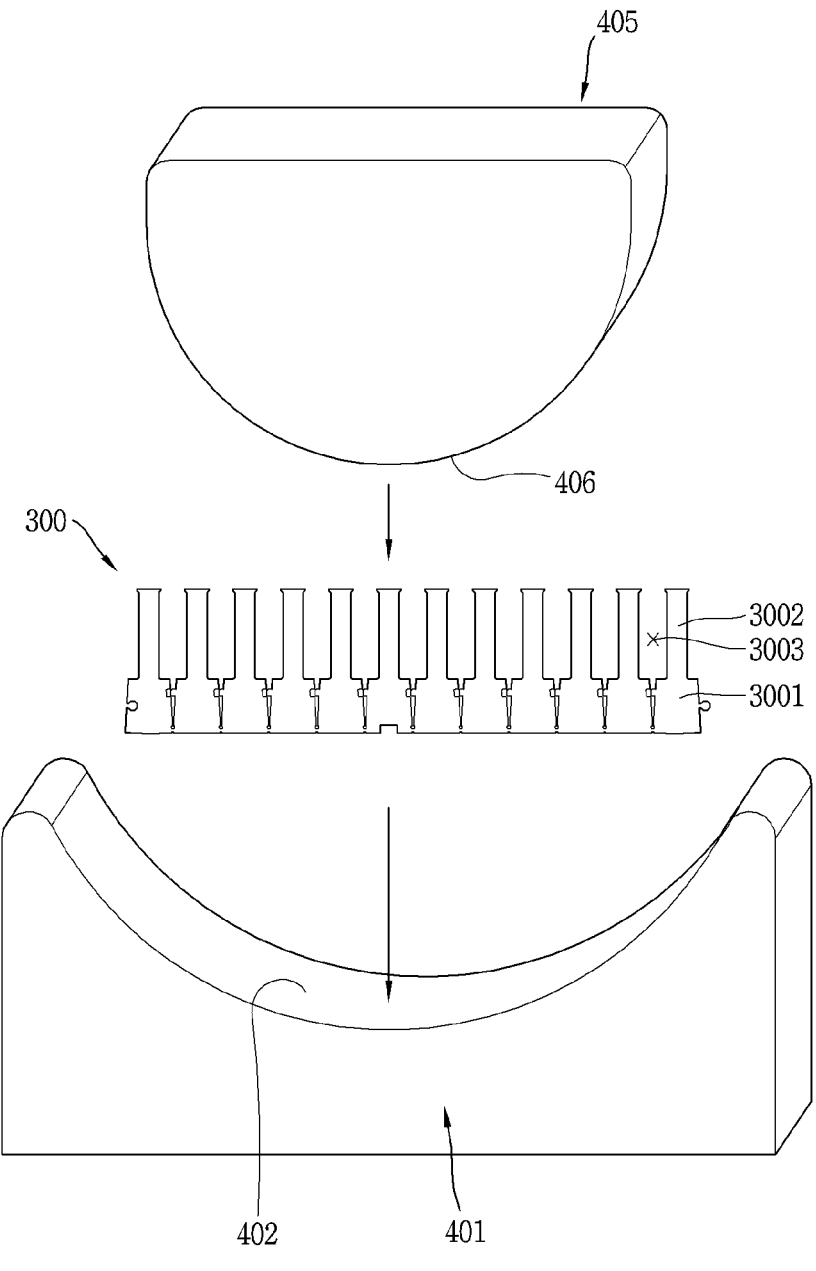
FIG. 12 is a diagram for explaining a state before bending in a process of bending the split core of FIG. 6.
Figure 13:
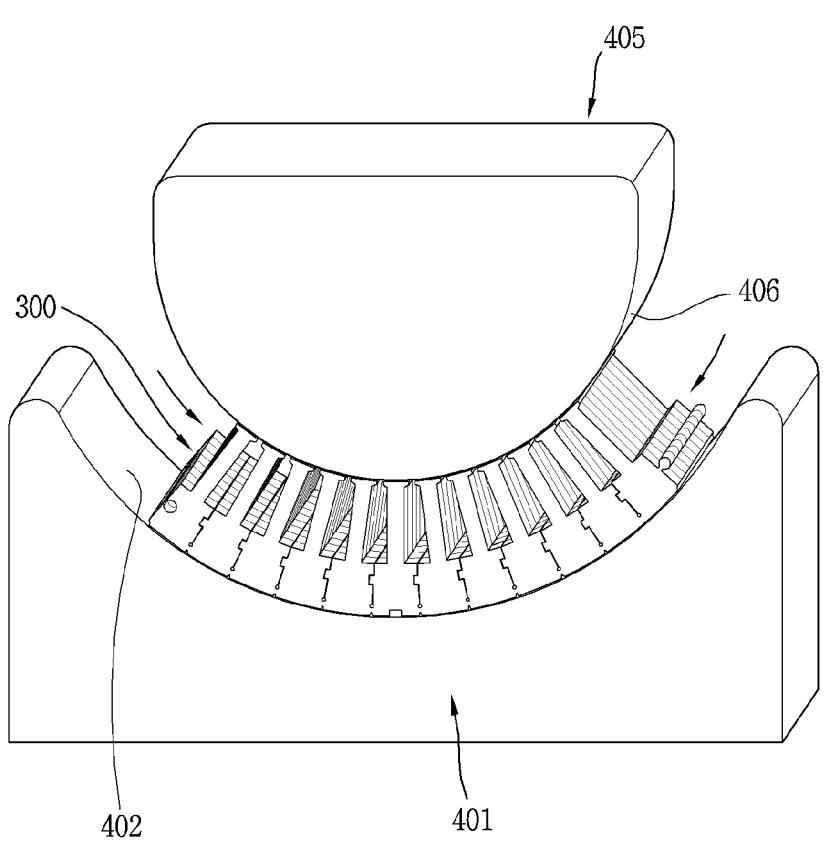
FIG. 13 is a diagram for explaining a bent state in the process of bending the split core of FIG. 12.
Figure 14:
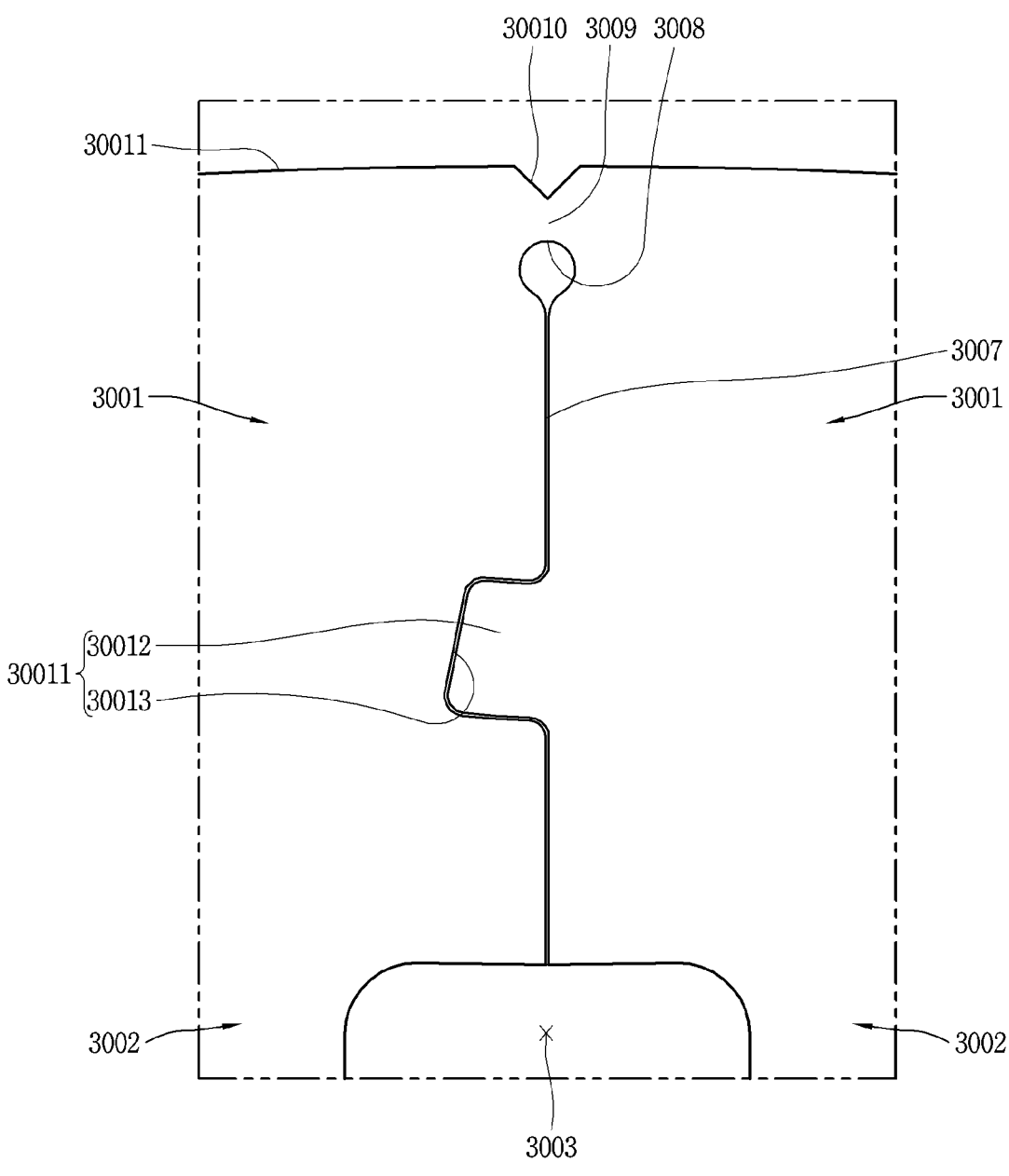
FIG. 14 is an enlarged view of a region of a fitting coupling portion of the split core of FIG. 13.
Figure 15:
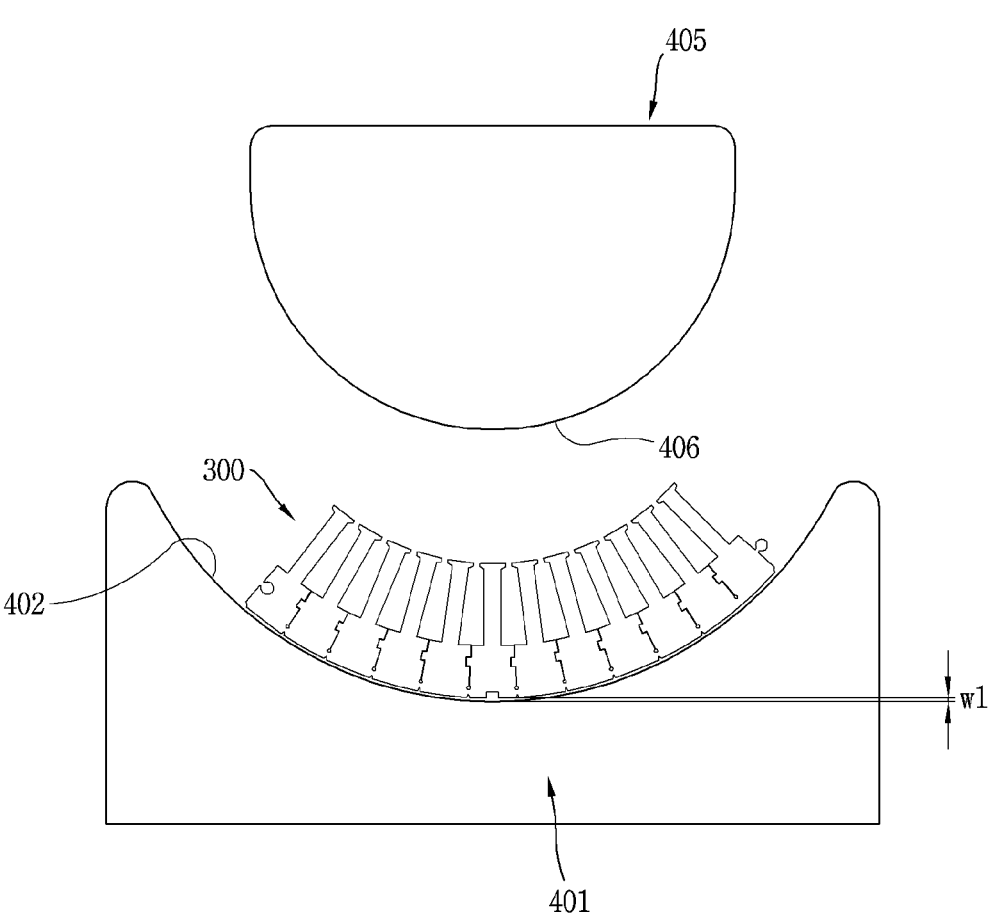
FIG. 15 is a diagram for explaining a state after bending the split core of FIG. 13.

FIG. 11 is a perspective view of the split cores 300 of FIG. 6 before bending. FIG. 12 is a diagram for explaining a state before bending in a process of bending the split cores 300 of FIG. 6. FIG. 13 is a diagram for explaining a bent state in the process of bending the split cores 300 of FIG. 12. FIG. 14 is an enlarged view of a region of a fitting coupling portion of the split cores 300 of FIG. 13. FIG. 15 is a diagram for explaining a state after bending the split cores 300 of FIG. 13.

As illustrated in FIG. 8, two split cores 300 are respectively molded in the base material 290 configured as an electric steel plate having one rectangular plate shape.

An alignment guide (a mac point) 30020 is provided in the respective split cores 300.

In this implementation, the alignment guide (a mac point) 30020 may be provided in each of the yoke parts 3001 and the teeth parts 3002.

Thus, each of the split cores 300 may be stacked accurately in a preset position.

The outer surface portion 3001a of the split cores 300 is provided with a recessed portion 30018 recessed inwardly in a radial direction. The recessed portion 30018 may be used in a process of manufacturing the split cores 300.

Two molded split cores 300 are separate from each other, and respectively stacked in an expanded state as illustrated in FIG. 11.

As illustrated in FIG. 12, the stacked split cores 300 are bent in a circular arc shape by a pair of jigs 401 and 405 which may approach each other.

The jigs 401 and 405 for molding the split cores 300 are configured to include a lower jig 401 to contact an outer circumferential surface of the split cores 300, and an upper jig 405 to contact an inner end of the split cores 300.

The upper jig 405 may be, for example, arranged over the lower jig 401 and be configured to approach or separate from the lower jig 401.

The lower jig 401 includes an outer circumferential molding surface 402 having a circular arc shape corresponding to an outer circumference (the outer surface portion 3001a) of the split cores 300.

The outer circumferential molding surface 402 is provided on an upper surface of the lower jig 401 to have a concave circular arc shape.

The upper jig 405 includes an inner circumferential molding surface 406 having a convex circular arc shape corresponding to an inner circumference (the inner end 30051) of the split cores 300.

The inner circumferential molding surface 406 is provided on a lower surface of the upper jig 405 to have a convex circular arc shape.

The split cores 300 stacked linearly are placed on the outer circumferential molding surface 402 of the lower jig 401 in a state when the yoke parts 3001 are arranged downwardly.

The upper jig 405 is lowered toward the lower jig 401, and the inner circumferential molding surface 406 comes in contact with and presses the end portion 30051 of the teeth parts 3002 of the split cores 300. Thus, as illustrated in FIG. 13, the split cores 300 are molded to have a circular arc shape having a convex outer circumference.

Then, cutting parts 3007 of the respective yoke parts 3001 are moved to be in mutual contact with each other by movement hinged about the connecting part 3009 due to pressing force of the upper jig 405, and the protrusion 30012 is coupled into the protrusion accommodation portion 30013.

In detail, as illustrated in FIG. 14, the parallel section 30071 and the inclined section 30072 of the cutting parts 3007 of the yoke parts 3001 adjacent to each other are brought into a mutual surface contact, and the communication hole 3008 is closed to form nearly a circular shape.

A first side surface 300121 of the protrusion 30012 is in mutual contact with a first side surface 300131 of the protrusion accommodation portion 30013, and a second side surface 300122 of the protrusion 30012 is in mutual contact with a second side surface 300132 of the protrusion accommodation portion 30013.

When the molding of the split cores 300 is finished, the upper jig 405 moves apart from the split cores 300 as illustrated in FIG. 15.

In the split cores 300 according to an implementation, spring-back is remarkably suppressed to thereby facilitate molding of a circular arc shape.

As illustrated in FIG. 15, in the split cores 300 according to disclosed embodiments, the spring back phenomenon after lifting the upper jig 405 may only cause the circular arc shape of the split core to lose its shape corresponding to the outer circumferential molding surface 402 of the lower jig 401 by a first width w1.

In addition, in the split cores 300 in this implementation, coupling strength in a radial direction remarkably increases due to coupling of the protrusion 30012 and the protrusion accommodating portion 30013.

Figure 16:
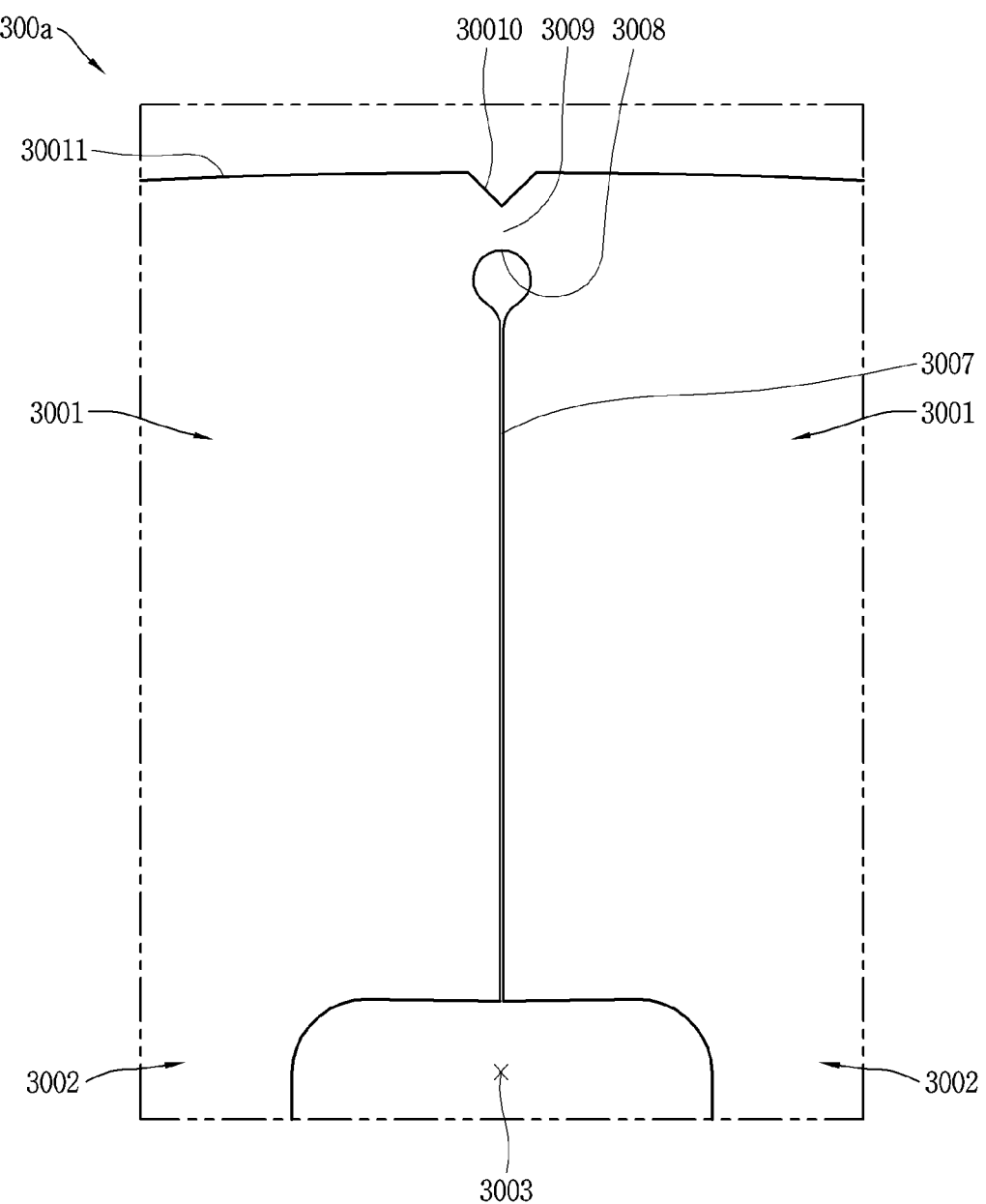
FIG. 16 illustrates a comparative example for explaining a split core in which a fitting coupling portion of FIG. 15 is not provided.
Figure 17:
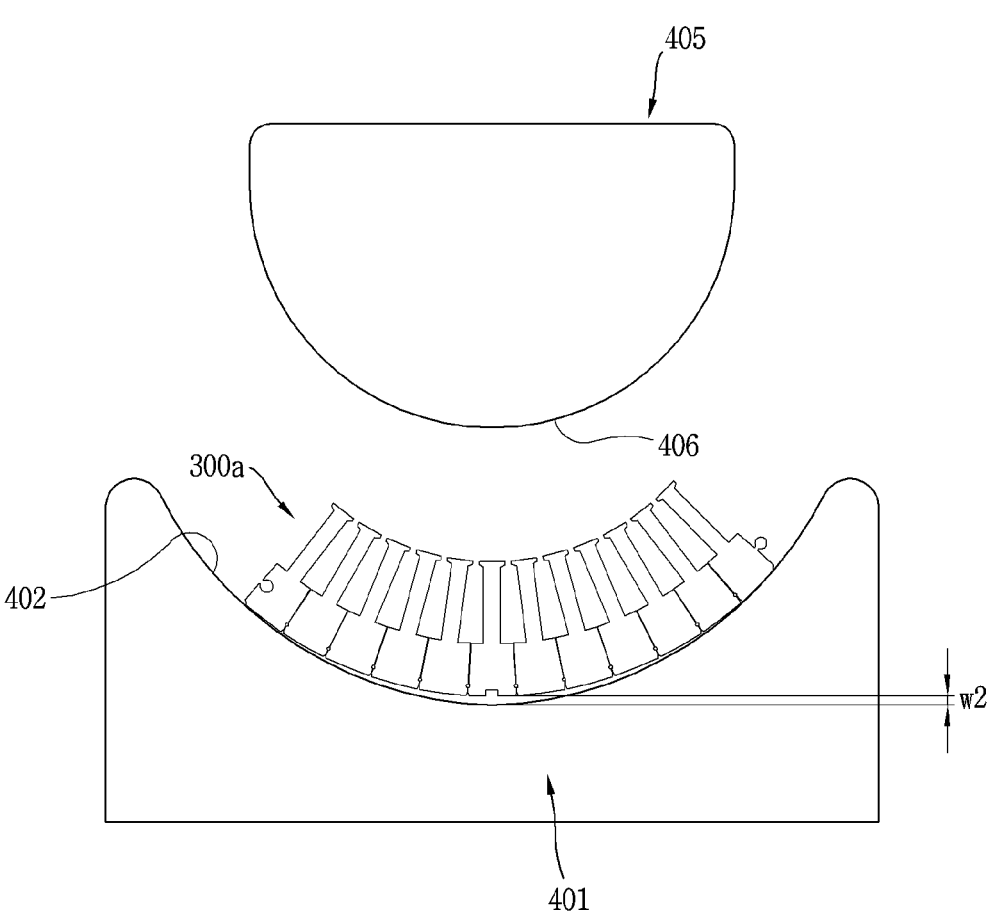
FIG. 17 is a diagram for explaining a state after bending of the split core of FIG. 16.
Figure 18:
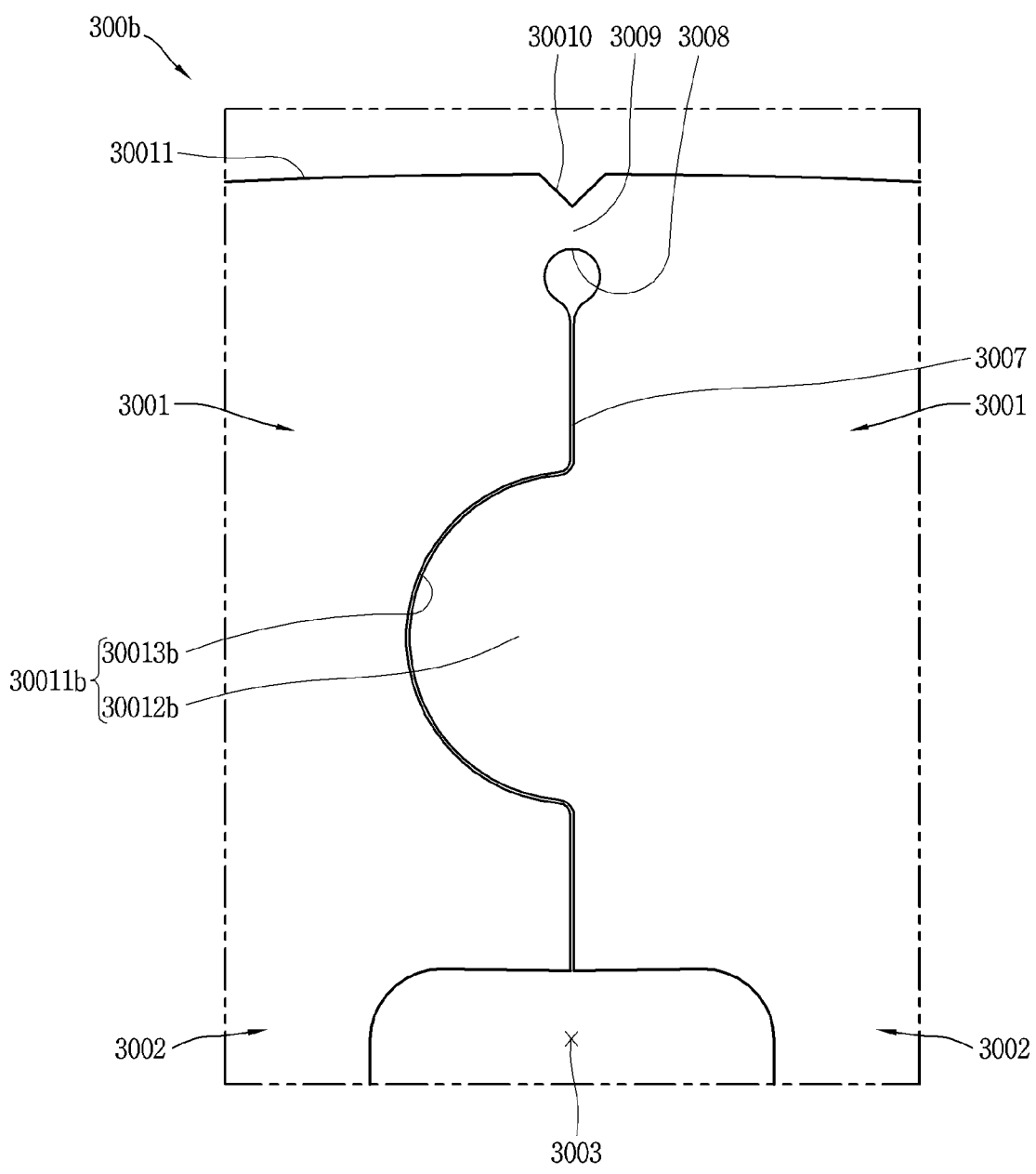
FIG. 18 is an enlarged view of a fitting coupling portion of a motor according to another implementation of the present disclosure.
Figure 19:
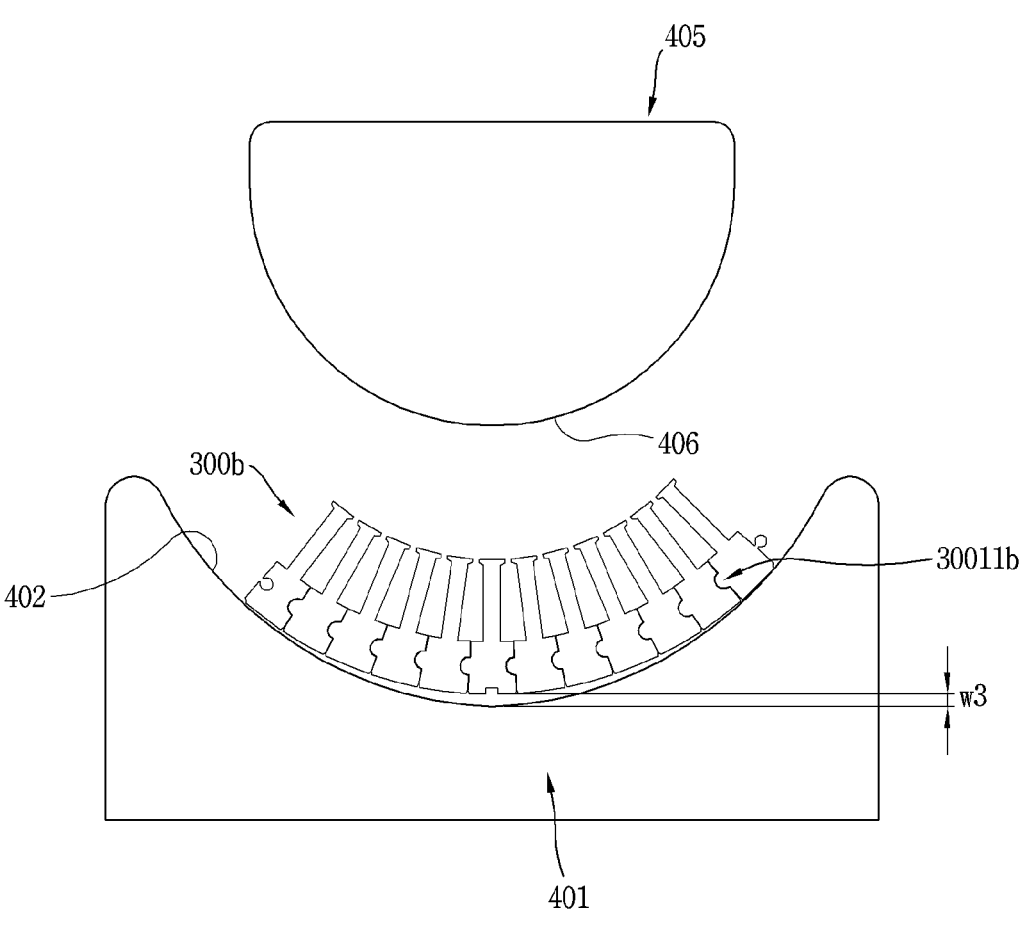
FIG. 19 is a diagram for explaining a state after bending of a split core of FIG. 18.
Figure 20:
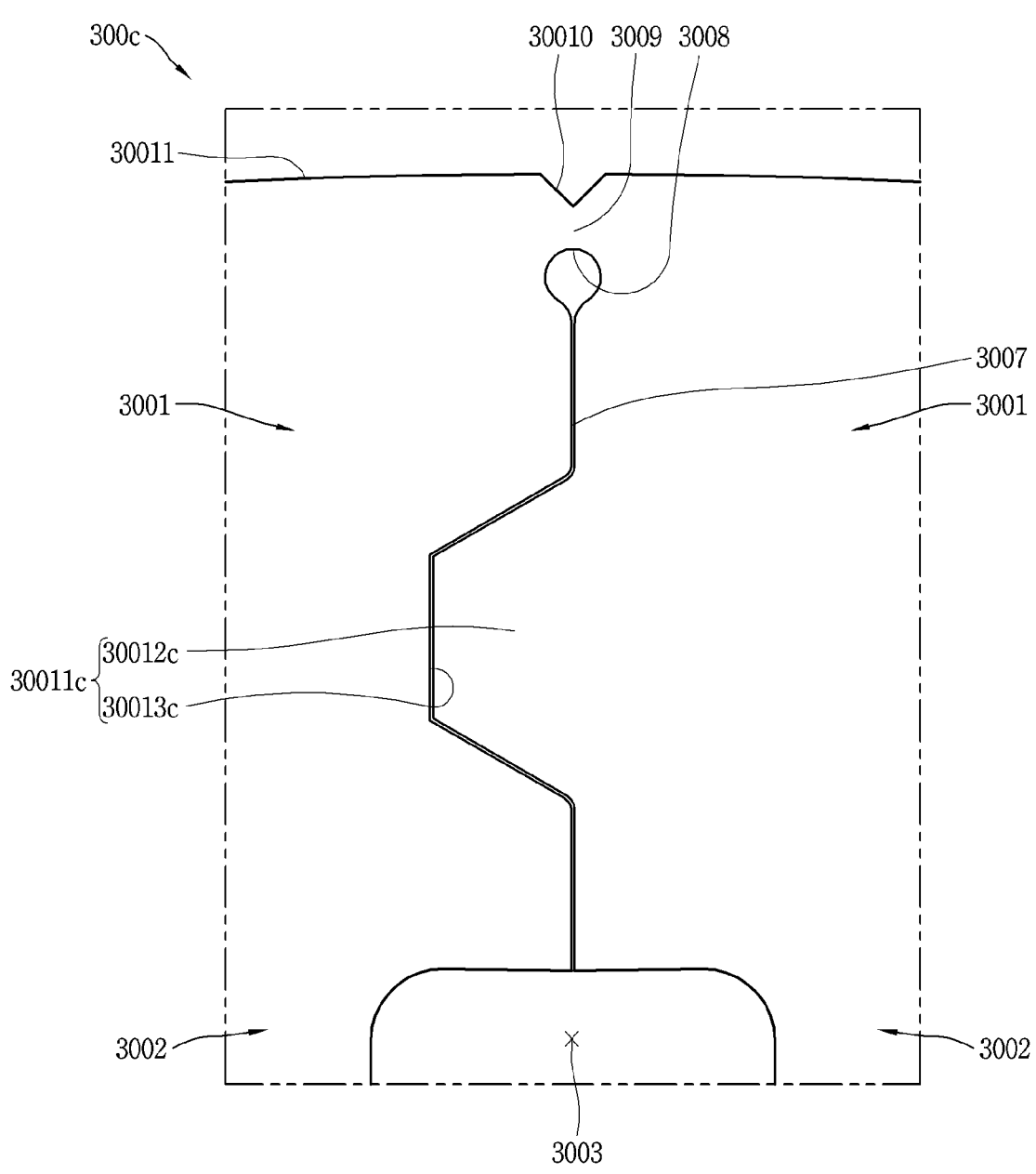
FIG. 20 is an enlarged view of a fitting coupling portion of a motor according to another implementation of the present disclosure.
Figure 21:
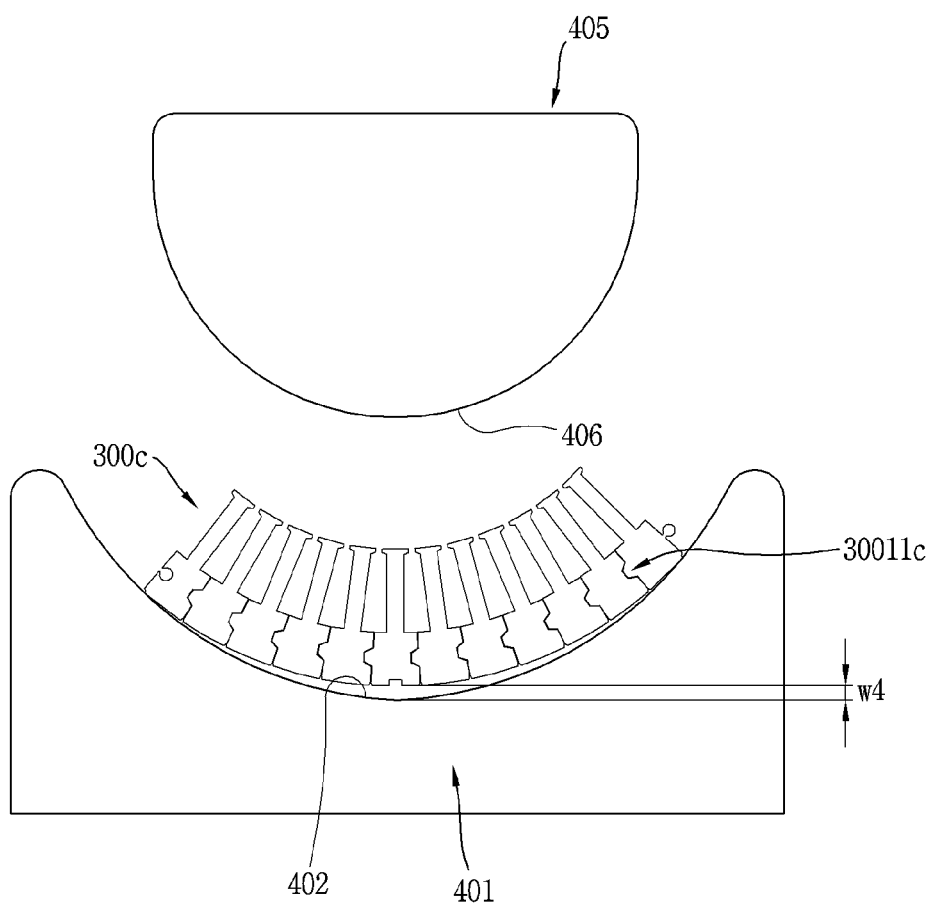
FIG. 21 is a diagram for explaining a state after bending of a split core of FIG. 20.

FIG. 16 illustrates a comparative example for explaining a split core in which the fitting coupling portion of FIG. 15 is not provided. FIG. 17 is a diagram for explaining a state after bending of the split core of FIG. 16. FIG. 18 is an enlarged view of a fitting coupling portion of a motor according to another implementation of the present disclosure. FIG. 19 is a diagram for explaining a state after bending of the split core of FIG. 18. FIG. 20 is an enlarged view of a fitting coupling portion of a motor according to another implementation of the present disclosure. FIG. 21 is a diagram for explaining a state after bending of the split core of FIG. 20.

As illustrated in FIGS. 16 and 17, the stator core 210 of a motor in a comparative example includes a plurality of split cores 300a coupled to each other in a ring shape in a circumferential direction.

As described above, the split cores 300a include the plurality of yoke parts 3001 positioned adjacent to each other, the plurality of teeth parts 3002 protruding from the yoke parts 3001 in a radial direction, respectively, the cutting parts 3007 cut between the yoke parts adjacent to each other in a radial direction, and the connection part 3009 for hingedly connecting the adjacent yoke parts 3001 to rotate relative to each other.

In this comparative example, the protrusion 30012 and the protrusion accommodation portion 30013 each described above are not included on mutual contact surfaces between the split cores 300a.

The split cores 300a in this comparative example may be stacked in a laterally expanded state as described above.

As illustrated in FIG. 17, the linearly stacked split cores 300a may be molded to have a circular arc shape by the lower jig 401 including the outer circumferential molding surface 402 and the upper jig 405 including the inner circumferential molding surface 406.

When the upper jig 405 is lowered to press the split cores 300a, the linearly stacked split cores 300a are molded to have a circular arc shape so that the cutting parts 3007 are in mutual contact with each other.

In this case, the split cores 300a in this comparative example do not include the protrusion 30012 and the protrusion accommodation portion 30013 both described above. Thus, coupling strength in a circumferential direction comparatively deteriorates, thereby resulting in a relative increase in spring-back.

After the split cores 300a are molded to have a circular arc shape, the spring back phenomenon causes the split cores 300a to lose its shape and separate from a shape of the outer circumferential molding surface 402 of the lower jig 401 by a second width w2 inwardly along a radial direction.

As illustrated in FIGS. 18 and 19, the stator core 210 of the motor in this implementation includes a plurality of split cores 300b coupled to each other in a ring shape along a circumferential direction.

In this implementation, as described above, the split cores 300b include the yoke parts 3001 positioned adjacent to each other, the teeth parts 3002 respectively protruding from the yoke parts 3001 in a radial direction, the cutting parts 3007 cut in a radial direction between the yoke parts adjacent to each other, and the connection parts 3009 for connecting the adjacent yoke parts 3001 to rotate relative to each other.

In this implementation, fitting coupling portions 30011b fit to be coupled to each other are provided on mutual contact surfaces of the split cores 300b in a circumferential direction.

In this implementation, the fitting coupling portions 30011b include a protrusion 30012b protruding from one of the mutual contact surfaces of the split cores 300b along a circumferential direction, and a protrusion accommodation portion 30013b recessed in a circumferential direction to accommodate the protrusion 30012b.

The protrusion 30012b may be implemented, for example, to have a circular arc shape protruding outwardly.

The protrusion accommodation portion 30013b may be implemented to have a circular arc shape recessed inwardly to be in surface contact with the protrusion 30012b.

By using this configuration, as described above, the split cores 300b are stacked in a linearly expanded state.

As illustrated in FIG. 19, the linearly stacked split cores 300b may be molded to have a circular arc shape between the lower jig 401 and the upper jig 405 both described above.

As the upper jig 405 is lowered to press the split cores 300b, the linearly stacked split cores 300b are deformed to have a circular arc shape so that the cutting parts 3007 of the yoke parts 3001 are in mutual contact with each other. In this case, the protrusion 30012b is coupled into the protrusion accommodation portion 30013b.

In this implementation, it is checked whether the coupling of the protrusion 30012b into the protrusion accommodation portion 30013b improves coupling strength of the split cores 300b in a radial direction, compared to coupling strength of the split cores 300a in the comparative example described above.

In this implementation, after the split cores 300b are molded to have a circular arc shape, the spring back phenomenon causes the split cores 300*b* to lose its shape and separate from a shape of the outer circumferential molding surface 402 of the lower jig 401 inwardly by a third width w3 along a radial direction.

As illustrated in FIGS. 20 and 21, the stator core 210 of the motor in another implementation includes a plurality of split cores 300*c* coupled to each other in a ring shape along a circumferential direction.

In this implementation, as described above, the split cores 300*c* include the yoke parts 3001 positioned adjacent to each other, the teeth parts 3002 respectively protruding from the yoke parts 3001 in a radial direction, the cutting parts 3007 cut in a radial direction between the yoke parts adjacent to each other, and the connection parts 3009 for hingedly connecting the adjacent yoke parts 3001 to rotate relative to each other.

In this implementation, fitting coupling portions 30011*c* fit to be coupled to each other are provided on mutual contact surfaces of the split cores 300*c* in a circumferential direction.

In this implementation, the fitting coupling portions 30011*c* include a protrusion 30012*c* protruding from one of the mutual contact surfaces of the split cores 300*c* along a circumferential direction, and a protrusion accommodation portion 30013*c* recessed in a circumferential direction to accommodate the protrusion 30012*c*.

The protrusion 30012*c* may be implemented, for example, to protrude to have an edge shaped like a parallelogram, or half of a hexagonal shape. In this implementation, the protrusion 30012*c* may be implemented, for example, to have an outer width reduced along a protruding direction.

The protrusion accommodation portion 30013*c* may be implemented to have a correspondingly recessed inwardly to be in surface contact with the protrusion 30012.

By using this configuration, as described above, the split cores 300*c* are stacked in a linearly expanded state.

As illustrated in FIG. 21, the linearly stacked split cores 300*c* may be molded to have a circular arc shape between the lower jig 401 and the upper jig 405 both described above.

As the upper jig 405 is lowered to press the split cores 300*c*, the linearly stacked split cores 300*c* are deformed to have a circular arc shape so that the yoke parts 3001 are in mutual contact with each other. In this case, the protrusion 30012*c* is coupled into the protrusion accommodation portion 30013*c*.

In this implementation, after the split cores 300*c* are molded to have a circular arc shape, the spring back phenomenon causes the split cores 300*c* to lose its shape and separate from a shape of the outer circumferential molding surface 402 of the lower jig 401 inwardly by a fourth width w4 along a radial direction.

In this implementation, it is checked whether the coupling of the protrusion 30012*c* into the protrusion accommodation portion 30013*c* improves coupling strength of the split cores 300*c* in a radial direction compared to coupling strength of the split cores 300*a* in the comparative example described above.

After the split cores 300, 300*b*, are 300*c* are molded using the fitting coupling portions 30011, 30011*b*, and 30011*c* in the split cores 300, 300*b*, and 300*c*, respectively, when the widths w1, w3, and w4 of displacement each obtained according to the spring-back phenomenon are compared to the width w2 in the comparative example, the first width w1 in the split cores 300 caused by the spring-back phenomenon in the implementation described with reference to FIG. 15 is remarkably reduced compared to the second width w2 in the split cores 300*a* in the comparative example described above. The third width w3 in the split cores 300*b* in the implementation with reference to FIG. 18 and the fourth w4 in the split cores 300*c* in the implementation with reference to FIG. 20 are slightly reduced compared to the width w2 in the split cores 300*a* in the comparative example.

In addition, with respect to maximum stress in regions of the connection parts 3009 in the split cores 300, 300*b*, and 300*c* after the split cores 300, 300*b*, and 300*c* are molded, it is interpreted that maximum stress in the split cores 300 in the implementation with reference to FIG. 15 is reduced compared to that in the split cores 300*a* in the comparative example of FIG. 16. In addition, it is interpreted that maximum stress in the split cores 300*b* in the implementation described with reference to FIG. 18 and maximum stress in the split cores 300*c* in the implementation described with reference to FIG. 20 are reduced compared to the maximum stress in the split cores 300*a* in the comparative example described with reference to FIG. 16.

Figure 22:
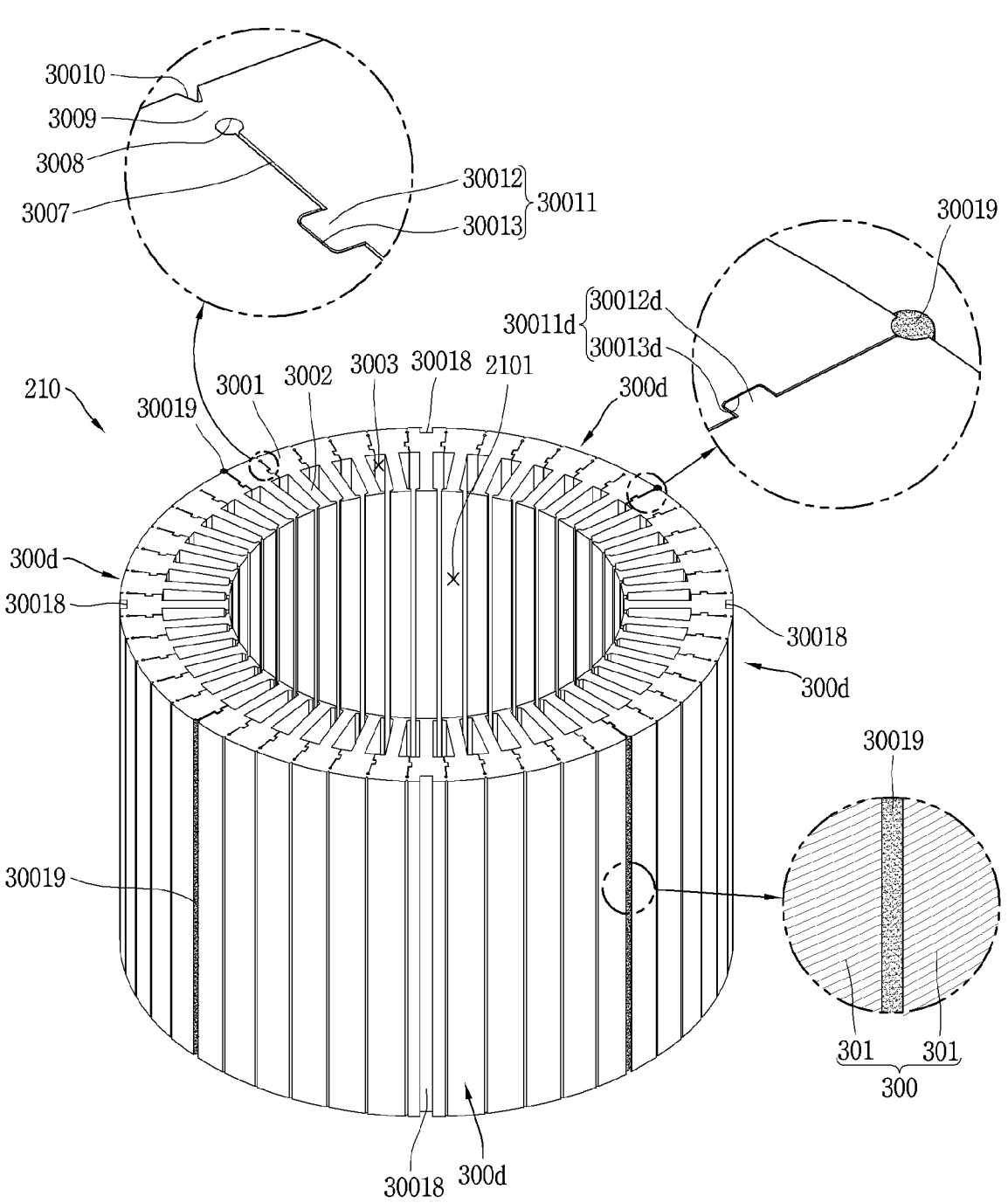
FIG. 22 is a perspective view of a stator core of a motor according to another implementation of the present disclosure.
Figure 23:
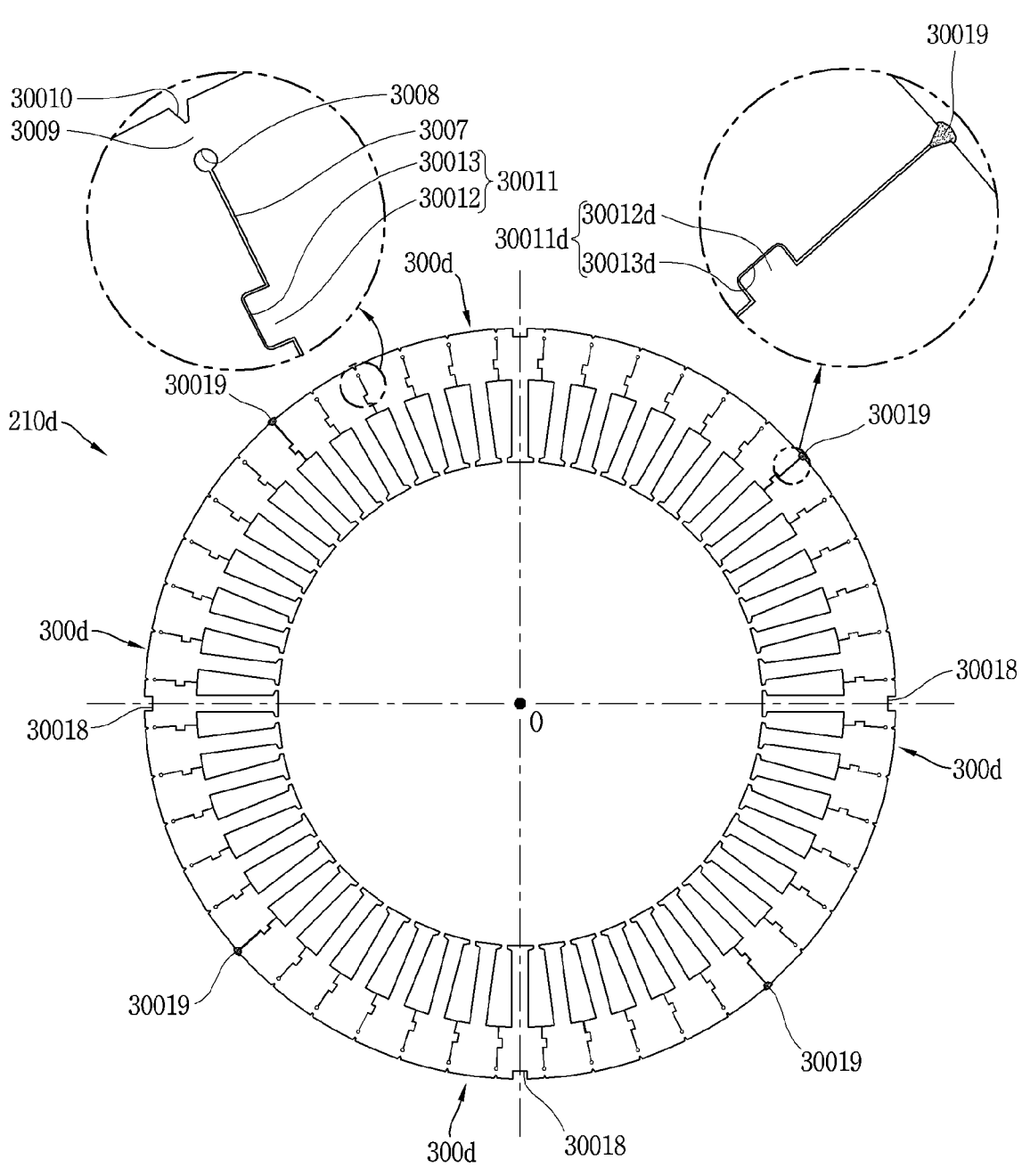
FIG. 23 is a planar view of the stator core of FIG. 22.

FIG. 22 is a perspective view of a stator core of a motor according to another implementation of the present disclosure. FIG. 23 is a planar view of the stator core of FIG. 22. As illustrated in FIGS. 22 and 23, a stator core 210*d* of a motor in this implementation includes a plurality of split cores 300*d* coupled in a ring shape along a circumferential direction.

As described above, the split cores 300*d* include the plurality of yoke parts 3001 positioned adjacent to each other, the plurality of teeth parts 3002 respectively protruding from the yoke parts 3001 in a radial direction, the cutting parts 3007 cut in a radial direction between the yoke parts adjacent to each other, and the connection part 3009 for connecting the adjacent yoke parts 3001 to rotate relative to each other.

In this implementation, four split cores 300*d* are implemented to be coupled to each other in a ring shape.

In this implementation, fitting coupling portions 30011*d* fit to be coupled to each other along a circumferential direction are provided on mutual contact surfaces of two adjacent yoke parts 3001.

The fitting coupling portions 30011*d* are configured, for example, to include a protrusion 30012*d* protruding from one of the two adjacent yoke parts 3001 along a circumferential direction, and a protrusion accommodation portion 30013*d* recessed to accommodate the protrusion 30012*d*.

Here, the protrusion 30012*d* and the protrusion accommodation portion 30013*d* are configured identically to the protrusion 30012 and the protrusion accommodation portion 30013 provided in the cutting part 3007 of the yoke parts 3001, respectively.

Here, the protrusion 30012*d* and the protrusion accommodation portion 30013*d* are provided to include a first side surface in a circular arc shape having a radius with a center at the connection portion 3009 with a first radius R1, and a second side surface in a circular arc shape having a radius with a center at the connection portion 3009 with a second radius R2 greater than the first radius R1.

Thus, a size of scraps remaining when the split cores 300*d* are molded may be reduced.

Unlike the implementation described with reference to FIGS. 1 to 15 in which the coupling protrusion 30016 is provided on one side of the split core 300 along a circumferential direction and the coupling protrusion accommodation portion 30017 is provided on an opposite side of the split core, the protrusion 30012 is provided on one side of the split cores 300*d* (a left side surface in the drawing), and the protrusion accommodation portion 30013 is provided on another side of the split cores 300*d* (a right side surface in the drawing) in this implementation.

By using this configuration, four split cores 300*d* are coupled to each other along a circumferential direction. The protrusion 30012*d* on the left side surface of each of the split cores 300*d* is coupled into the protrusion accommodation portion 30013*d* on a right side surface of a next adjacent split core 300*d*.

The four split cores 300*d* coupled to each other in a ring shape may be welded to be mutually coupled to each other. Welding portions 30019 are provided on outer circumferences of mutual contact areas of the four split cores 300*d* and extend along the split core in an axial direction. The stator core 210*d* in this implementation includes four welding portions 30019 spaced along a circumferential direction.

Figure 24:
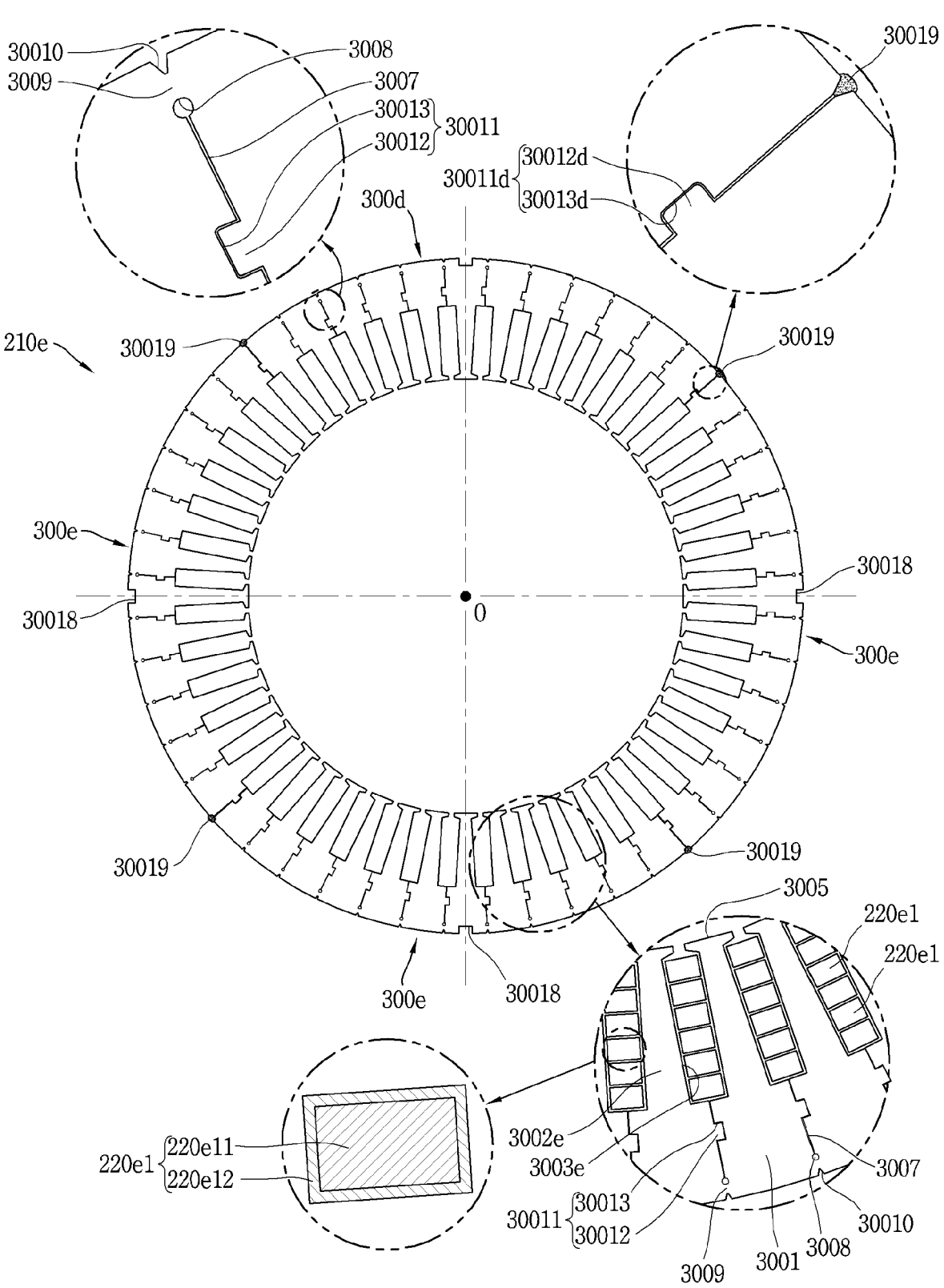
FIG. 24 is a planar view of a stator core of a motor according to another implementation of the present disclosure.

FIG. 24 is a planar view of the stator core of the motor according to another implementation of the present disclosure. As illustrated in FIG. 24, the stator core 210*e* of the motor in this implementation includes a plurality of split cores 300*e* coupled to each other in a ring shape in a circumferential direction.

In this implementation, as described above, the split cores 300*e* include the yoke parts 3001 positioned adjacent to each other, the teeth parts 3002 respectively protruding from the yoke parts 3001 in a radial direction, the cutting parts 3007 cut in a radial direction between the yoke parts adjacent to each other, and the connection parts 3009 for hingedly connecting the adjacent yoke parts 3001 to rotate relative to each other.

In this implementation, four split cores 300*e* are implemented to be coupled to each other in a ring shape.

In this implementation, in the split cores 300*e*, the fitting coupling portions 30011 of two adjacent yoke parts 3001 contact each other to be coupled along a circumferential direction.

The fitting coupling portions 30011 are configured, for example, to include the protrusion 30012 protruding from one of the two adjacent yoke parts 3001 along a circumferential direction, and the protrusion accommodation portion 30013 recessed to accommodate the protrusion 30012.

The protrusion 30012 and the protrusion accommodation portion 30013 are provided to include a first side surface in a circular arc shape having a radius with a center at the connection portion 3009 with a first radius R1, and a second side surface in a circular arc shape having a radius with a center at the connection portion 3009 with a second radius R2 greater than the first radius R1.

Thus, a size of scraps remaining when the split cores 300*e* are molded may be reduced.

In this implementation, the protrusion 30012*d* is provided at one end of a split core 300*e*, and the protrusion accommodation portion 30013*d* is provided at another end of an adjacent split core 300*e* along a circumferential direction.

By doing so, adjacent split cores 300*e* arranged along the circumferential direction may be coupled to each other.

In this implementation, a case when the protrusion 30012*d* and the protrusion accommodation portion 30013*d* are provided at opposite ends of each split core 300*e* is presented as an example. However, the coupling protrusion 30016 and the coupling protrusion accommodation portion 30017 may be configured to be provided at opposite ends of each split core 300*e*, as discussed above.

In some implementations, the slots 3003 are provided to have a same width.

The teeth parts 3002 are configured, for example, to have a width gradually reduced along an inward radial direction.

The teeth parts 3002 are provided, for example, such that both side surface portions along a circumferential direction are gradually reduced along an inward radial direction of the split cores 300*e*.

In an implementation, the stator coil 210*e* is wound on the stator core 210*e*.

In this implementation, the stator coil 210*e* is configured to include a plurality of conductor segments 220*e*1 inserted into the slots 3003 of the stator core 210*e*.

As is well known, the conductor segments 220*e*1 is configured to include an insertion portion inserted into the slots 3003, a crown portion extending from an end of the insertion portion, and a welding portion extending from another end of the insertion portion.

The conductor segments 220*e*1 are configured to include two insertion portions inserted into different slots 3003. The conductor segments 220*e*1 include a preset slot pitch, and are electrically connected to each other by welding portions of different semiconductor segments 220*e*1 to have a present pattern.

The conductor segments 220*e*1 are configured to include, for example, a semiconductor 220*e*11 having a rectangular cross-sectional shape, and an insulating coating material 220*e*12 coating and insulating an outer surface of the semiconductor 220*e*11.

In some implementations, the insertion portions of the semiconductor segments 220*e*1 are inserted into the slots 3003 to thereby form six layers.

The foregoing description has been given of specific implementations of the present disclosure. However, since the present disclosure can be embodied in various forms without departing from the essential characteristics, the implementations described above should not be limited by the specific contents for carrying out the disclosure.

In addition, even implementations not listed in the foregoing detailed description should be broadly construed within the scope of the technical idea defined in the appended claims. And, all changes and modifications included within the technical range of the claims and their equivalents should be embraced by the appended claims.

The invention claimed is:

1. A motor comprising:
   a stator; and
   a rotor configured to rotate about the stator,
   wherein the stator comprises: a stator core having a plurality of split cores respectively having a plurality of teeth and slots and coupled into a ring shape, and a stator coil inserted in the slots, and
   wherein each of the plurality of split cores comprises:
   a plurality of yoke parts positioned adjacent to each other;
   a plurality of teeth parts respectively protruding from the plurality of yoke parts in an inward radial direction;
   cutting parts cut along a radial direction between the yoke parts which are adjacent to each other; and
   a connection part respectively connecting the plurality of yoke parts such that adjacent yoke parts are rotatable with respect to the connection part, and
   wherein the plurality of yoke parts comprises an inner surface portion having a convex circular arc shape, and
   wherein a rotor accommodation hole configured to accommodate the rotor to be rotatable therein is provided in an inner surface of the stator core, and
   the rotor accommodation hole defined by inner end surfaces of the plurality of teeth parts having a circular arc shape, and wherein the inner surface portion of the plurality of yoke parts and the inner end surfaces of the plurality of teeth parts have a same curvature radius.

2. The motor of claim 1, further comprising fitting coupling portions on each of the plurality of yoke parts and configured to be coupled to each other in a circumferential direction of the stator.

3. The motor of claim 2, wherein a pair of corresponding fitting coupling portions comprises:

a protrusion protruding from one of two adjacent yoke parts; and a protrusion accommodation portion recessed to accommodate the protrusion disposed at the other of the two adjacent yoke parts.

4. The motor of claim 3, wherein the plurality of teeth parts are provided to have a constant width along the radial direction, and the cutting part during formation of the stator core comprises:

a parallel section aligned in parallel with a side surface of a corresponding teeth part; and an inclined section extending at an angle from the parallel section.

5. The motor of claim 4, wherein a first split core and a second split core of the plurality of split cores are formed from one electric steel plate having a rectangular shape, and wherein:

the first split core with a first plurality of yoke parts is linearly arranged along a first long side portion of the electric steel plate having a rectangular shape;

the second split core with a second plurality of yoke parts is linearly arranged along a second long side portion opposite to the first long side portion, and a first plurality of teeth parts of the first split core and a second plurality of teeth parts of the second split core oppose each other and are interleaved to be alternately arranged along a longitudinal direction of the electric steel plate.

6. The motor of claim 5, wherein a space between the parallel section of first split core and the parallel section of the second split core during formation of the stator core is 1.2 to 1.5 times a thickness of the electric steel plate.

7. The motor of claim 5, wherein:

ends of the plurality of teeth parts in the first split core and the second split core are each provided with shoes respectively laterally outwardly extending along a widthwise direction;

through portions for forming the teeth and the shoes are respectively disposed at both sides along a widthwise direction of ends of the shoes; and a space between the ends of the shoes and an edge of the through portions is provided as being 1.2 times or greater a thickness of the electric steel plate.

8. The motor of claim 5, wherein each of the protrusion and the protrusion accommodation portion comprises:

a first side surface having a circular arc shape with a first curvature radius having a center at a corresponding connection part of a yoke part; and a second side surface having a circular arc shape with a second curvature radius having a center at the corresponding connection part of the yoke part.

9. The motor of claim 3, wherein opposite side surfaces of each of the plurality of teeth parts are arranged along a radial direction, and the slots have a same width.

10. The motor of claim 1, wherein notches recessed inwardly are respectively provided adjacent to the connecting parts.

11. The motor of claim 1, wherein a communication hole which is in communication with the cutting part is formed inward from the connection part along a radial direction of each yoke part, and the communication hole extends through the plurality of yoke parts of the split core along an axial direction.

12. The motor of claim 1, wherein a coupling protrusion protruding in a circumferential direction is provided at an end of a first stator core, and a coupling protrusion accommodation portion in which the coupling protrusion is accommodated is provided at an end of a second stator core adjacent to the first stator core.

13. The motor of claim 12, wherein the coupling protrusion accommodation portion is provided with an opening open toward the coupling protrusion, and the coupling protrusion has a maximum width greater than a width of the opening, and is configured to be inserted into the coupling protrusion accommodation portion in an axial direction to couple the first and second stator cores.

14. The motor of claim 1, wherein the stator core has forty eight slots, and the plurality of split cores consists of four split cores with each comprising twelve teeth parts.

15. The motor of claim 1, wherein the plurality of split cores comprises a welding portion in a mutual contact area for contacting an adjacent split core.

16. A method of forming a stator core for constructing a stator of a motor, the method comprising:

forming a first split core and a second split core of the stator core from one electric steel plate having a rectangular shape, wherein:

the first split core with a first plurality of yoke parts is linearly arranged along a first long side portion of the electric steel plate having a rectangular shape;

the second split core with a second plurality of yoke parts is linearly arranged along a second long side portion opposite to the first long side portion, and a first plurality of teeth parts of the first split core and a second plurality of teeth parts of the second split core oppose each other and are interleaved to be alternately arranged along a longitudinal direction of the electric steel plate;

wherein each of the first and second split cores comprises:

a plurality of yoke parts positioned adjacent to each other;

a plurality of teeth parts respectively protruding from the plurality of yoke parts in an inward direction;

cutting parts cut between adjacent yoke parts and each comprising a parallel section aligned to be parallel with a side surface of a corresponding teeth part and an inclined section extending at an angle from the parallel section; and connection parts respectively connecting adjacent yoke parts such that the adjacent yoke parts are rotatable with respect to the connection part, and wherein the plurality of yoke parts comprises an inner surface portion having a convex circular arc shape, and wherein a rotor accommodation hole configured to accommodate the rotor to be rotatable therein is provided in an inner surface of the stator core, and the rotor accommodation hole defined by inner end surfaces of the plurality of teeth parts having a circular arc shape, and wherein the inner surface portion of the plurality of yoke parts and the inner end surfaces of the plurality of teeth parts have a same curvature radius.

17. The method of claim 16, further comprising bending at least the first split core by a force applied between a convex first surface and a corresponding concave second surface such that inner surfaces of the first plurality of teeth parts form a curved surface for defining a rotor accommodation hole of the stator configured to accommodate the rotor to be rotatable therein.

\* \* \* \* \*